United States Patent
Rodriguez et al.

(10) Patent No.: US 9,960,712 B2
(45) Date of Patent: May 1, 2018

(54) CONVERTER TOPOLOGIES AND CONTROL

(71) Applicant: SunPower Corporation, San Jose, CA (US)

(72) Inventors: Fernando Rodriguez, Austin, TX (US); Hengsi Qin, Austin, TX (US); Patrick Chapman, Austin, TX (US)

(73) Assignee: SunPower Corporation, San Jose, CA (US)

( * ) Notice: Subject to any disclaimer, the term of this patent is extended or adjusted under 35 U.S.C. 154(b) by 0 days. days.

(21) Appl. No.: 15/080,110

(22) Filed: Mar. 24, 2016

(65) Prior Publication Data
US 2016/0285387 A1 Sep. 29, 2016

Related U.S. Application Data

(60) Provisional application No. 62/138,184, filed on Mar. 25, 2015.

(51) Int. Cl.
*H02M 7/797* (2006.01)
*H02M 5/16* (2006.01)
(Continued)

(52) U.S. Cl.
CPC ............ *H02M 7/797* (2013.01); *H02J 7/34* (2013.01); *H02M 1/12* (2013.01); *H02M 1/15* (2013.01); *H02M 5/16* (2013.01); *H02M 5/458* (2013.01); *H02M 7/4807* (2013.01); *H02M 7/493* (2013.01); *H02M 7/5387* (2013.01);
(Continued)

(58) Field of Classification Search
CPC ............. H02M 1/4208; H02M 1/4233; H02M 3/33507; H02M 3/1584; H02M 3/33561; H02M 7/53871; H02M 7/521; H02M 7/5387

USPC .... 363/65, 71, 78, 81, 84, 95, 98, 124, 125, 363/131, 132
See application file for complete search history.

(56) References Cited

U.S. PATENT DOCUMENTS

| | | | |
|---|---|---|---|
| 5,140,201 A | 8/1992 | Uenishi | |
| 5,198,970 A * | 3/1993 | Kawabata | H02J 9/062 307/66 |

(Continued)

OTHER PUBLICATIONS

International Search Report and Written Opinion for International Application No. PCT/US2016/024024, dated Jun. 24, 2016, 15 pages.

(Continued)

*Primary Examiner* — Adolf Berhane
(74) *Attorney, Agent, or Firm* — Grasso PLLC

(57) ABSTRACT

An inverter includes a transformer that includes a first winding, a second winding, and a third winding, a DC-AC inverter electrically coupled to the first winding of the transformer, a cycloconverter electrically coupled to the second winding of the transformer, an active filter electrically coupled to the third winding of the transformer. The DC-AC inverter is adapted to convert the input DC waveform to an AC waveform delivered to the transformer at the first winding. The cycloconverter is adapted to convert an AC waveform received at the second winding of the transformer to the output AC waveform having a grid frequency of the AC grid. The active filter is adapted to sink and source power with one or more energy storage devices based on a mismatch in power between the DC source and the AC grid.

20 Claims, 16 Drawing Sheets

(51) Int. Cl.
    *H02M 1/12*    (2006.01)
    *H02M 1/15*    (2006.01)
    *H02M 5/458*   (2006.01)
    *H02M 7/48*    (2007.01)
    *H02M 7/5387*  (2007.01)
    *H02M 7/493*   (2007.01)
    *H02J 7/34*    (2006.01)
    *H02M 1/00*    (2006.01)

(52) U.S. Cl.
    CPC ............ *H02M 2001/007* (2013.01); *H02M 2001/123* (2013.01); *Y02B 70/1441* (2013.01)

(56) References Cited

U.S. PATENT DOCUMENTS

| | | | |
|---|---|---|---|
| 5,982,645 A * | 11/1999 | Levran | H01F 27/2866 307/66 |
| 6,330,170 B1 * | 12/2001 | Wang | H02J 9/062 363/17 |
| 6,954,366 B2 * | 10/2005 | Lai | H02M 5/293 363/71 |
| 8,279,642 B2 | 10/2012 | Chapman et al. | |
| 2005/0116767 A1 | 6/2005 | Cavazzoni | |
| 2006/0256470 A1 | 11/2006 | Juds et al. | |
| 2008/0055954 A1 | 3/2008 | Kajouke et al. | |
| 2011/0026282 A1 | 2/2011 | Chapman et al. | |
| 2011/0181128 A1 | 7/2011 | Perreault et al. | |
| 2012/0098344 A1 | 4/2012 | Bergveld et al. | |
| 2014/0268908 A1 * | 9/2014 | Zhou | H02M 7/5381 363/21.03 |
| 2014/0300206 A1 | 10/2014 | Moes et al. | |

OTHER PUBLICATIONS

International Search Report and Written Opinion for International Application No. PCT/US2016/024026, dated Jun. 24, 2016, 14 pages.

Krishnaswami et al., "Three-Port Series-Resonanr DC-DC Converter to Interface Renewable Energy Sources With Bidirectional Load and Energy Storage Ports", IEEE Transactions on Power Electronics, vol. 24, No. 10, Oct. 2009, pp. 2289-2297.

Brandon J. Pierquet, "Designs for Ultra-High Efficiency Grid-Connected Power Conversion", Massachusetts Institute of Technology, Thesis, Jun. 2011, 215 pages.

* cited by examiner

CONVERTER TOPOLOGIES AND CONTROL

CROSS-REFERENCE TO RELATED U.S. PATENT APPLICATION

The present application claims priority under 35 U.S.C. § 119(e) to U.S. Provisional Patent Application Ser. No. 62/138,184, entitled "DC-TO-AC INVERTER TOPOLOGIES" by Patrick Chapman, which was filed on Mar. 25, 2015, the entirety of which is hereby incorporated by reference.

GOVERNMENT RIGHTS

This invention was made in part with government support under Grant No. DE-EE0005341 awarded by the Department of Energy. The Government has certain rights in this invention.

TECHNICAL FIELD

The present disclosure relates, generally, to power converters for converting direct current (DC) power to alternating current (AC) power and, more particularly, to converter topologies and control techniques.

BACKGROUND

Power inverters convert a DC power to an AC power. For example, some power inverters are configured to convert the DC power to an AC power suitable for supplying energy to an AC grid and, in some cases, an AC load that may or may not be coupled to the AC grid. One particular application for such power inverters is the conversion of DC power generated by an alternative energy source, such as photovoltaic cells ("PV cells" or "solar cells"), fuel cells, DC wind turbine, DC water turbine, and other DC power sources, to a single-phase AC power for delivery to the AC grid at the grid frequency. The amount of power that can be delivered by certain alternative energy sources, such as PV cells, may vary in magnitude over time due to temporal variations in operating conditions. For example, the output of a typical PV cell will vary as a function of variations in sunlight intensity, angle of incidence of sunlight, ambient temperature and other factors.

In a typical photovoltaic power system, an inverter may be associated with one or more solar cell panels. For example, some systems include strings of solar cell panels that deliver a relatively high, combined voltage (e.g., nominal 450 V) to a single, large inverter. Alternatively, in other systems such as a distributed photovoltaic power system, an inverter may be associated with each solar cell panel. In such systems, the solar cell panels are typically small, relatively low voltage (e.g., 25 V). The inverter may be placed in close proximity to the associated solar cell panel to increase the conversion efficiency of the overall system.

SUMMARY

According to one aspect, an inverter for converting an input direct current (DC) waveform from a DC source to an output alternating current (AC) waveform for delivery to an AC grid may include a transformer that includes a first winding, a second winding, and a third winding. The inverter may further include a DC-AC inverter electrically coupled to the first winding of the transformer, a cycloconverter electrically coupled to the second winding of the transformer, and an active filter electrically coupled to the third winding of the transformer. The DC-AC inverter is adapted to convert the input DC waveform to an AC waveform delivered to the transformer at the first winding. The cycloconverter is adapted to convert an AC waveform received at the second winding of the transformer to the output AC waveform having a grid frequency of the AC grid. The active filter is adapted to sink and source power with one or more energy storage devices based on a mismatch in power between the DC source and the AC grid.

In some embodiments, the DC-AC inverter may include a full-bridge inverter circuit. Further, in some embodiments, the first winding may include a first terminal and a second terminal, the full-bridge inverter circuit may include a first electrical switch electrically coupled to a second electrical switch at a first node and a third electrical switch electrically coupled to a fourth electrical switch at a second node, the DC-AC inverter may include a capacitor and an inductor electrically coupled in series with the first node and the first terminal, and the second terminal may be electrically coupled to the second node. In some embodiments, the first winding may include a first terminal and a second terminal, and the full-bridge inverter circuit may include a first electrical switch electrically coupled to a second electrical switch and the first terminal at a first node and a third electrical switch electrically coupled to a fourth switch and the second terminal at a second node. In some embodiments, the first winding may include a first terminal and a second terminal, the full-bridge inverter circuit may include a first electrical switch electrically coupled to a second electrical switch at a first node and a third electrical switch electrically coupled to a fourth electrical switch at a second node, and the DC-AC inverter may include an inductor electrically coupled to the first node and the first terminal and a capacitor electrically coupled to the second node and the second terminal.

In some embodiments, the cycloconverter may include a set of electrical switches and a capacitor divider electrically coupled with the set of electrical switches. Further, the second winding may include a first terminal and a second terminal, the set of electrical switches may include a first subset of electrical switches electrically coupled to a second subset of electrical switches at a first node, the capacitor divider may include a first capacitor electrically coupled to a second capacitor and the first terminal at a second node, and the cycloconverter may include an inductor electrically coupled to the second terminal and the first node. In some embodiments, each of the first subset of electrical switches and the second subset of electrical switches consists of a pair of blocking switches electrically coupled in series.

In some embodiments, the active filter may include a full-bridge switching circuit electrically coupled to the one or more energy storage devices. Further, the third winding may include a first terminal and a second terminal, and the full-bridge switching circuit may include a first electrical switch electrically coupled to a second electrical switch and the first terminal at a first node and a third electrical switch electrically coupled to a fourth electrical switch and the second terminal at a second node. In some embodiments, the third winding may include a first terminal and a second terminal, the full-bridge switching circuit may include a first electrical switch electrically coupled to a second electrical switch at a first node and a third electrical switch electrically coupled to a fourth electrical switch at a second node, and the active filter may include an inductor electrically coupled to the first node and the first terminal and a capacitor electrically coupled to the second node and the second terminal.

In some embodiments, the active filter may include the one or more energy storage devices, a half-bridge switching circuit, and a capacitor divider electrically coupled to the one or more energy storage devices and the half-bridge switching circuit. Further, the third winding may include a first terminal and a second terminal, the half-bridge switching circuit may include a first electrical switch electrically coupled to a second electrical switch and the first terminal at a first node, and the capacitor divider may include a first capacitor electrically coupled to a second capacitor and the second terminal at a second node. In some embodiments, the third winding may include a first terminal and a second terminal, the half-bridge switching circuit may include a first electrical switch electrically coupled to a second electrical switch and the first terminal at a first node, the capacitor divider may include a first capacitor electrically coupled to a second capacitor at a second node, and the active filter may include an inductor electrically coupled to the second terminal and the second node. The one or more energy storage devices may consist of a capacitor. Further, the DC source may include a photovoltaic module.

According to another aspect, an inverter for converting an input direct current (DC) waveform from a DC source to an output alternating current (AC) waveform for delivery to an AC grid may include a controller having a processor and a memory and a transformer that includes a first winding, a second winding, and a third winding. Further, the inverter may include a DC-AC inverter electrically coupled to the first winding of the transformer, a cycloconverter electrically coupled to the second winding of the transformer, and an active filter electrically coupled to the third winding of the transformer and comprising a plurality of electrical switches and one or more energy storage devices. The DC-AC inverter may be adapted to convert the input DC waveform to an AC waveform delivered to the transformer at the first winding. The cycloconverter may be adapted to convert an AC waveform received at the second winding of the transformer to the output AC waveform having a grid frequency of the AC grid. The controller may be adapted to control the switching cycles of the plurality of electrical switches of the active filter to sink and source power with the one or more energy storage devices based on a mismatch in power between the DC source and the AC grid.

In some embodiments, the controller may be adapted to control the switching cycles of the plurality of electrical switches using zero-voltage switching. The DC source may include a photovoltaic module.

According to yet another aspect, an inverter for converting an input direct current (DC) waveform from a DC source to an output alternating current (AC) waveform for delivery to an AC grid may include a transformer that includes a first winding, a second winding, and a third winding. The inverter may further include a DC-AC inverter electrically coupled to the first winding of the transformer, a cycloconverter electrically coupled to the second winding of the transformer, an active filter electrically coupled to the third winding of the transformer and comprising a plurality of electrical switches and one or more energy storage devices, a processor, and a memory comprising a plurality of instructions stored thereon that, in response to execution by the processor, causes the inverter to control the switching cycles of the plurality of electrical switches of the active filter to sink and source power with the one or more energy storage devices based on a mismatch in power between the DC source and the AC grid. The DC-AC inverter may be adapted to convert the input DC waveform to an AC waveform delivered to the transformer at the first winding. The cycloconverter may be adapted to convert an AC waveform received at the second winding of the transformer to the output AC waveform having a grid frequency of the AC grid.

According to another aspect, an inverter for converting an input direct current (DC) waveform from a DC source to an output alternating current (AC) waveform for delivery to an AC grid may include a transformer that includes a first winding and a second winding. The inverter may further include a DC-AC inverter electrically coupled to the first winding of the transformer, a cycloconverter electrically coupled to the second winding of the transformer, and an active filter electrically coupled to the second winding of the transformer. The DC-AC inverter may be adapted to convert the DC waveform to an AC waveform delivered to the transformer at the first winding. The cycloconverter may be adapted to convert an AC waveform received at the second winding of the transformer to the output AC waveform having a grid frequency of the AC grid. The active filter may be adapted to sink and source power with one or more energy storage devices based on a mismatch in power between the DC source and the AC grid.

In some embodiments, the cycloconverter may include a set of electrical switches and a capacitor divider electrically coupled with the set of electrical switches. Further, the second winding may include a first terminal and a second terminal, the set of electrical switches may include a first subset of electrical switches electrically coupled to a second subset of electrical switches at a first node, the capacitor divider may include a first capacitor electrically coupled to a second capacitor and the first terminal at a second node, and the cycloconverter may include an inductor electrically coupled to the second terminal and the first node. The active filter may include the one or more energy storage devices and a full-bridge switching circuit electrically coupled to the one or more energy storage devices. Additionally, the full-bridge switching circuit may include a first electrical switch and a second electrical switch electrically coupled to one another and to the inductor and the second terminal at a common node and a third electrical switch and a fourth electrical switch electrically coupled to one another and to the first terminal at the second node.

In some embodiments, the DC-AC inverter may include a full-bridge inverter circuit. Further, the first winding may include a first terminal and a second terminal, the full-bridge inverter circuit may include a first electrical switch electrically coupled to a second electrical switch at a first node and a third electrical switch electrically coupled to a fourth electrical switch at a second node, the DC-AC inverter may include a capacitor electrically coupled to the first node and the first terminal, and the second terminal may be electrically coupled to the second node. The one or more energy storage devices may consist of a capacitor. The DC source may include a photovoltaic module.

According to another aspect, an inverter for converting an input direct current (DC) waveform from a DC source to an output alternating current (AC) waveform for delivery to an AC grid may include a transformer that includes a first winding and a second winding. The inverter may further include a DC-AC inverter electrically coupled to the first winding of the transformer, an active filter electrically coupled to the second winding of the transformer, and a cycloconverter electrically coupled to the active filter. The DC-AC inverter may be adapted to convert the DC waveform to an AC waveform delivered to the transformer at the first winding, the active filter may be adapted to sink and source power with one or more energy storage devices based on a mismatch in power between the DC source and the AC grid, and the cycloconverter may be adapted to convert an AC waveform received from the active filter to the output AC waveform having a grid frequency of the AC grid.

In some embodiments, the DC-AC inverter may include a half-bridge inverter circuit and a capacitor divider electrically coupled to the half-bridge inverter circuit. Further, the first winding may include a first terminal and a second terminal, the half-bridge inverter circuit may include a first electrical switch electrically coupled to a second electrical switch and the first terminal at a first node, and the capacitor divider may include a first capacitor electrically coupled to a second capacitor and the second terminal at a second node. In some embodiments, the cycloconverter may include a set of electrical switches and a capacitor divider electrically coupled with the set of electrical switches. Additionally, the set of electrical switches may include a first subset of electrical switches electrically coupled to a second set of electrical switches at a first node, and the capacitor divider may include a first capacitor electrically coupled to a second capacitor at a second node.

In some embodiments, each of the first subset of electrical switches and the second subset of electrical switches consists of a pair of blocking switches electrically coupled in series. The active filter may include a first half-bridge converter circuit and second capacitor divider electrically coupled to the second winding and a second half-bridge converter circuit and a third capacitor divider electrically coupled to the cycloconverter. In some embodiments, the second winding may include a first terminal and a second terminal, the first half-bridge converter may include a first electrical switch and a second electrical switch electrically coupled to one another and to the first terminal at a third node, and the second capacitor divider may include a third capacitor and a fourth capacitor electrically coupled to one another and to the second terminal at a fourth node. Further, the second half-bridge converter may include a third electrical switch and a fourth electrical switch electrically coupled to one another at a fifth node, the third capacitor divider may include a fifth capacitor electrically coupled to a sixth capacitor at the second node, and the cycloconverter may include an inductor electrically coupled to the first node and the fifth node. In some embodiments, the active filter may include a bridge capacitor electrically coupled to the first half-bridge converter, the second half-bridge converter, the second capacitor divider, and the third capacitor divider at a first common node and a second common node.

According to yet another aspect, an inverter for converting an input direct current (DC) waveform from a DC source to an output alternating current (AC) waveform for delivery to an AC grid may include a transformer that includes a first winding and a second winding. The inverter may further include a DC-AC inverter electrically coupled to the first winding of the transformer, a cycloconverter electrically coupled to the second winding of the transformer, and an active filter electrically coupled to the first winding of the transformer. The DC-AC inverter may be adapted to convert the DC waveform to an AC waveform delivered to the transformer at the first winding. The cycloconverter may be adapted to convert an AC waveform received at the second winding of the transformer to the output AC waveform having a grid frequency of the AC grid. The active filter may be adapted to sink and source power with one or more energy storage devices based on a mismatch in power between the DC source and the AC grid.

According to an aspect, a method for controlling an inverter for converting an input direct current (DC) waveform from a DC source to an output alternating current (AC) waveform for delivery to an AC grid may include determining a switching frequency of electrical switches of the inverter based on a grid voltage of the AC grid and one or more circuit parameters, wherein the inverter includes a transformer and a DC-AC inverter, a cycloconverter, and an active filter electrically coupled to the transformer, determining a first phase shift of a first actuation signal for electrical switches of the DC-AC inverter and a second phase shift of a second actuation signal for electrical switches of the cycloconverter relative to a third actuation signal for electrical switches of the active filter, generating a set of pulse width modulated signals for actuation of the electrical switches of the inverter based on the determined first phase shift and the determined second phase shift.

In some embodiments, generating the set of pulse width modulated signals may include generating a first pulse width modulated signal for actuation of the electrical switches of the DC-AC inverter, generating a second pulse width modulated signal for actuation of the electrical switches of the cycloconverter, and generating a third pulse width modulated signal for actuation of the electrical switches of the active filter. Each of the first pulse width modulated signal, the second pulse width modulated signal, and the third pulse width modulated signal may have an approximately fifty percent duty cycle. In some embodiments, determining the switching frequency may include determining the switching frequency based on circuit parameters of one or more resonant tank circuits of the inverter.

In some embodiments, determining the first phase shift may include determining a current of the DC source for regulating a voltage of the DC source based on maximum power point tracking, scaling the switching frequency to facilitate system linearized operation, and determining a linear operating range to permit zero voltage switching of the DC-AC inverter based on the voltage of the DC source and a voltage of the active filter. Further, determining the current of the DC source for regulating the voltage of the DC source may include eliminating double ripple feedback from the AC grid with a harmonic regulator. In some embodiments, scaling the switching frequency comprises dynamically scaling the switching frequency based on a gain scheduling function of switching frequency and the one or more circuit parameters.

In some embodiments, determining the second phase shift may include determining a grid current of the AC grid for regulation of a voltage of the active filter, scaling the switching frequency to facilitate system linearized operation, and determining a linear operating range to permit zero voltage switching of the cycloconverter based on the voltage of the active filter and a voltage of the AC grid. Further, generating the set of pulse width modulated signals may include alternating between a first pulse width modulated signal having a first frequency and a second pulse width modulated signal having a second frequency to achieve a third pulse width modulated signal with a third frequency between the first frequency and the second frequency. In some embodiments, alternating between the first pulse width modulated signal and the second pulse width modulated signal may include alternating based on a weighted average of the first frequency and the second frequency that approximates the third frequency.

In some embodiments, the method may further include operating the DC-AC inverter, the cycloconverter, and the active filter based on the generated set of pulse width modulated signals such that a corresponding pulse width modulated signal supplied to one of the DC-AC inverter, the cycloconverter, or the active filter is disabled every other switching period. The pulse width modulated signal supplied to the active filter may be disabled every other switching period.

According to another aspect, one or more machine-readable storage media comprising a plurality of instructions stored thereon that, in response to execution by a controller, may cause the controller to determine a switching frequency of electrical switches of an inverter based on a grid voltage of an alternating current (AC) grid and one or more circuit parameters, wherein the inverter includes a transformer and a direct current to alternating current (DC-AC) inverter, a cycloconverter, and an active filter electrically coupled to the transformer, determine a first phase shift of a first actuation signal for electrical switches of the DC-AC inverter and a second phase shift of a second actuation signal for electrical switches of the cycloconverter relative to a third actuation signal for electrical switches of the active filter, generate a set of pulse width modulated signals for actuation of the electrical switches of the inverter based on the determined first phase shift and the determined second phase shift.

In some embodiments, to generate the set of pulse width modulated signals may include to generate a first pulse width modulated signal for actuation of the electrical switches of the DC-AC inverter, generate a second pulse width modulated signal for actuation of the electrical switches of the cycloconverter, and generate a third pulse width modulated signal for actuation of the electrical switches of the active filter. Each of the first pulse width modulated signal, the second pulse width modulated signal, and the third pulse width modulated signal may have an approximately fifty percent duty cycle.

In some embodiments, to determine the switching frequency may include to determine the switching frequency based on circuit parameters of one or more resonant tank circuits of the inverter. Further, to determine the first phase shift may include to determine a current of the DC source for regulation of a voltage of the DC source based on maximum power point tracking, determine the switching frequency to facilitate system linearized operation, and determine a linear operating range to permit zero voltage switching of the DC-AC inverter based on the voltage of the DC source and a voltage of the active filter. Further, to determine the second phase shift may include to determine a grid current of the AC grid for regulation of a voltage of the active filter, scale the switching frequency to facilitate system linearized operation, and determine a linear operating range to permit zero voltage switching of the cycloconverter based on the voltage of the active filter and a voltage of the AC grid.

According to yet another embodiment, an inverter for converting an input direct current (DC) waveform from a DC source to an output alternating current (AC) waveform for delivery to an AC grid may include a controller having a processor and a memory and a transformer comprising a first winding and a second winding, The inverter may further include a DC-AC inverter electrically coupled to the first winding of the transformer, a cycloconverter electrically coupled to the second winding of the transformer, and an active filter electrically coupled to the transformer and adapted to sink and source power with one or more energy storage devices based on a mismatch in power between the DC source and the AC grid. The DC-AC inverter may be adapted to convert the input DC waveform to an AC waveform delivered to the transformer at the first winding. The cycloconverter may be adapted to convert an AC waveform received at the second winding of the transformer to the output AC waveform having a grid frequency of the AC grid. The controller may be adapted to determine a switching frequency of electrical switches of the inverter based on a grid voltage of the AC grid and one or more circuit parameters, determine a first phase shift of a first actuation signal for electrical switches of the DC-AC inverter and a second phase shift of a second actuation signal for electrical switches of the cycloconverter relative to a third actuation signal for electrical switches of the active filter, and generate a set of pulse width modulated signals for actuation of the electrical switches of the inverter based on the determined first phase shift and the determined second phase shift.

In some embodiments, the transformer further may include a third winding, and the active filter may be electrically coupled to the third winding of the transformer.

According to an aspect, an inverter for converting an input direct current (DC) waveform from a DC source to an output alternating current (AC) waveform for delivery to an AC grid may include a transformer that includes a first winding, a second winding, and a third winding. The inverter may further include a DC-AC inverter electrically coupled to the first winding of the transformer, a cycloconverter electrically coupled to the second winding of the transformer, an active filter electrically coupled to the third winding of the transformer, and a shoot-through fault protection circuit electrically coupled to the cycloconverter and adapted to (i) determine whether a current sensed in the cycloconverter exceeds a current threshold value and (ii) limit the current in response to a determination that the current exceeds the current threshold value. The DC-AC inverter may be adapted to convert the input DC waveform to an AC waveform delivered to the transformer at the first winding. The cycloconverter may be adapted to convert an AC waveform received at the second winding of the transformer to the output AC waveform having a grid frequency of the AC grid. The active filter may be adapted to sink and source power with one or more energy storage devices based on a mismatch in power between the DC source and the AC grid.

In some embodiments, the shoot-through fault protection circuit may include a current sense resistor and a differential circuit. The cyloconverter may include a set of electrical switches and a capacitor divider electrically coupled with the set of electrical switches. Further, in some embodiments, the second winding may include a first terminal and a second terminal, the set of electrical switches may include a first subset of electrical switches electrically coupled to a second subset of electrical switches at a first node, the capacitor divider may include a first capacitor electrically coupled to a second capacitor and the first terminal at a second node, and the cycloconverter may include an inductor electrically coupled to the second terminal and the first node. The shoot-through fault protection circuit may be electrically coupled to the first subset of electrical switches. In some embodiments, to limit the current may include to force an electrical switch of the plurality of electrical switches into a passive operational state.

According to another aspect, an inverter for converting an input direct current (DC) waveform from a DC source to an output alternating current (AC) waveform for delivery to an AC grid may include a transformer that includes a first winding and a second winding. The inverter may further include a DC-AC inverter electrically coupled to the first winding of the transformer, a cycloconverter electrically coupled to the second winding of the transformer, an active filter electrically coupled to the second winding of the transformer, and a shoot-through fault protection circuit electrically coupled to the cycloconverter and adapted to (i) determine whether a current sensed in the cycloconverter exceeds a current threshold value and (ii) limit the current in response to a determination that the current exceeds the current threshold value. The DC-AC inverter may be adapted to convert the DC waveform to an AC waveform delivered to the transformer at the first winding. The cycloconverter may be adapted to convert an AC waveform received at the second winding of the transformer to the output AC waveform having a grid frequency of the AC grid. The active filter may be adapted to sink and source power with one or more energy storage devices based on a mismatch in power between the DC source and the AC grid.

In some embodiments, the shoot-through fault protection circuit may include a current sense resistor and a differential circuit. The cyloconverter may include a set of electrical switches and a capacitor divider electrically coupled with the set of electrical switches. Further, in some embodiments, the second winding may include a first terminal and a second terminal, the set of electrical switches may include a first subset of electrical switches electrically coupled to a second subset of electrical switches at a first node, the capacitor divider may include a first capacitor electrically coupled to a second capacitor and the first terminal at a second node, and the cycloconverter may include an inductor electrically coupled to the second terminal and the first node. Further, the shoot-through fault protection circuit may be electrically coupled to the first subset of electrical switches. In some embodiments, to limit the current may include to force an electrical switch of the set of electrical switches into a passive operational state.

According to yet another aspect, an inverter for converting an input direct current (DC) waveform from a DC source to an output alternating current (AC) waveform for delivery to an AC grid may include a transformer that includes a first winding and a second winding. The transformer may further include a DC-AC inverter electrically coupled to the first winding of the transformer, an active filter electrically coupled to the second winding of the transformer, a cycloconverter electrically coupled to the active filter, and a shoot-through fault protection circuit electrically coupled to the cycloconverter and adapted to (i) determine whether a current sensed in the cycloconverter exceeds a current threshold value and (ii) limit the current in response to a determination that the current exceeds the current threshold value. The DC-AC inverter may be adapted to convert the DC waveform to an AC waveform delivered to the transformer at the first winding. The active filter may be adapted to sink and source power with one or more energy storage devices based on a mismatch in power between the DC source and the AC grid. The cycloconverter may be adapted to convert an AC waveform received from the active filter to the output AC waveform having a grid frequency of the AC grid.

In some embodiments, the shoot-through fault protection circuit may include a current sense resistor and a differential circuit. The cyloconverter may include a set of electrical switches and a capacitor divider electrically coupled with the set of electrical switches. Additionally, the set of electrical switches may include a first subset of electrical switches electrically coupled to a second subset of electrical switches at a first node, the capacitor divider may include a first capacitor electrically coupled to a second capacitor at a second node, and the cycloconverter may include an inductor electrically coupled to the first node and the active filter.

In some embodiments, the shoot-through fault protection circuit may be electrically coupled to the first subset of electrical switches. Further, to limit the current may include to force an electrical switch of the set of electrical switches into a passive operational state.

DETAILED DESCRIPTION

Figure 1:
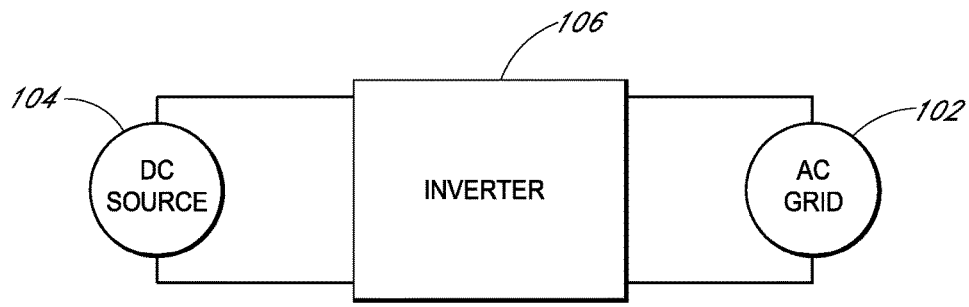
FIG. 1 is a simplified block diagram of at least one embodiment of a system for converting DC power to AC power.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Some embodiments of the disclosure, or portions thereof, may be implemented in hardware, firmware, software, or any combination thereof. Embodiments of the disclosure may also be implemented as instructions stored on a tangible, machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring to FIG. 1, a system 100 for supplying alternating current (hereinafter "AC") power to an AC grid 102 at a grid frequency includes a direct current (hereinafter "DC") source 104 and an inverter 106. The DC source 104 may be embodied as any type of DC source configured to generate or produce a DC power, which is supplied to the inverter 106. For example, the DC power may be embodied as a photovoltaic solar cell or array, a fuel cell, a wind turbine configured to generate a DC power (e.g., via a rectifying circuit), a water turbine configured to generate a DC power, or other unipolar power source.

The inverter 106 is electrically connected to the DC source 104 and configured to convert a DC waveform generated by the DC source 104 to an AC waveform suitable for delivery to the AC grid 102 and, in some embodiments, loads coupled to the AC grid 102. The AC grid 102 may be embodied as, for example, a utility power grid that supplies utility AC power to residential and commercial users. Such utility power grids may be characterized as having an essentially sinusoidal bipolar voltage at a fixed grid frequency (e.g., $f=\omega/2\pi=50$ Hz or 60 Hz).

Figure 2:
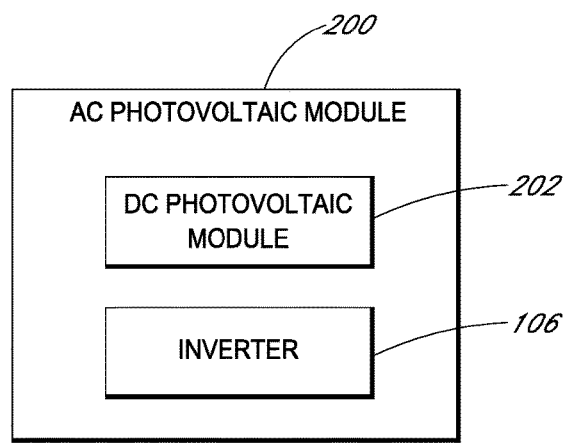
FIG. 2 is a simplified block diagram of at least one embodiment of an AC photovoltaic module of the system of FIG. 1.

As discussed above, in some embodiments, the DC source 104 may be embodied as one or more photovoltaic cells. In such embodiments, the DC source 104 and the inverter 106 may be associated with each other to embody an AC photovoltaic module (ACPV) 200 as illustrated in FIG. 2. The ACPV 200 includes a DC photovoltaic module (DCPV) 202, which operates as the DC source 104, electrically coupled to the inverter 106. The DCPV 202 includes one or more photovoltaic cells and is configured to deliver a DC waveform to the inverter 106 in response to receiving an amount of sunlight. The DC power delivered by the ACPV 200 is a function of environmental variables, such as, e.g., sunlight intensity, sunlight angle of incidence and temperature. In some embodiments, the inverter 106 is positioned in a housing of the ACPV 200. Alternatively, the inverter 106 may include its own housing secured to the housing of the ACPV 200. Additionally, in some embodiments, the inverter 106 is separate from the housing, but located near the DCPV 202. As discussed above, the inverter 106 is configured to convert the DC power received from the DCPV 202 to an AC power suitable for delivery to the AC grid 102 at the grid frequency. It should be appreciated that multiple ACPVs 200 may be used to form a solar array with each ACPV 200 having a dedicated inverter 106.

Figure 3:
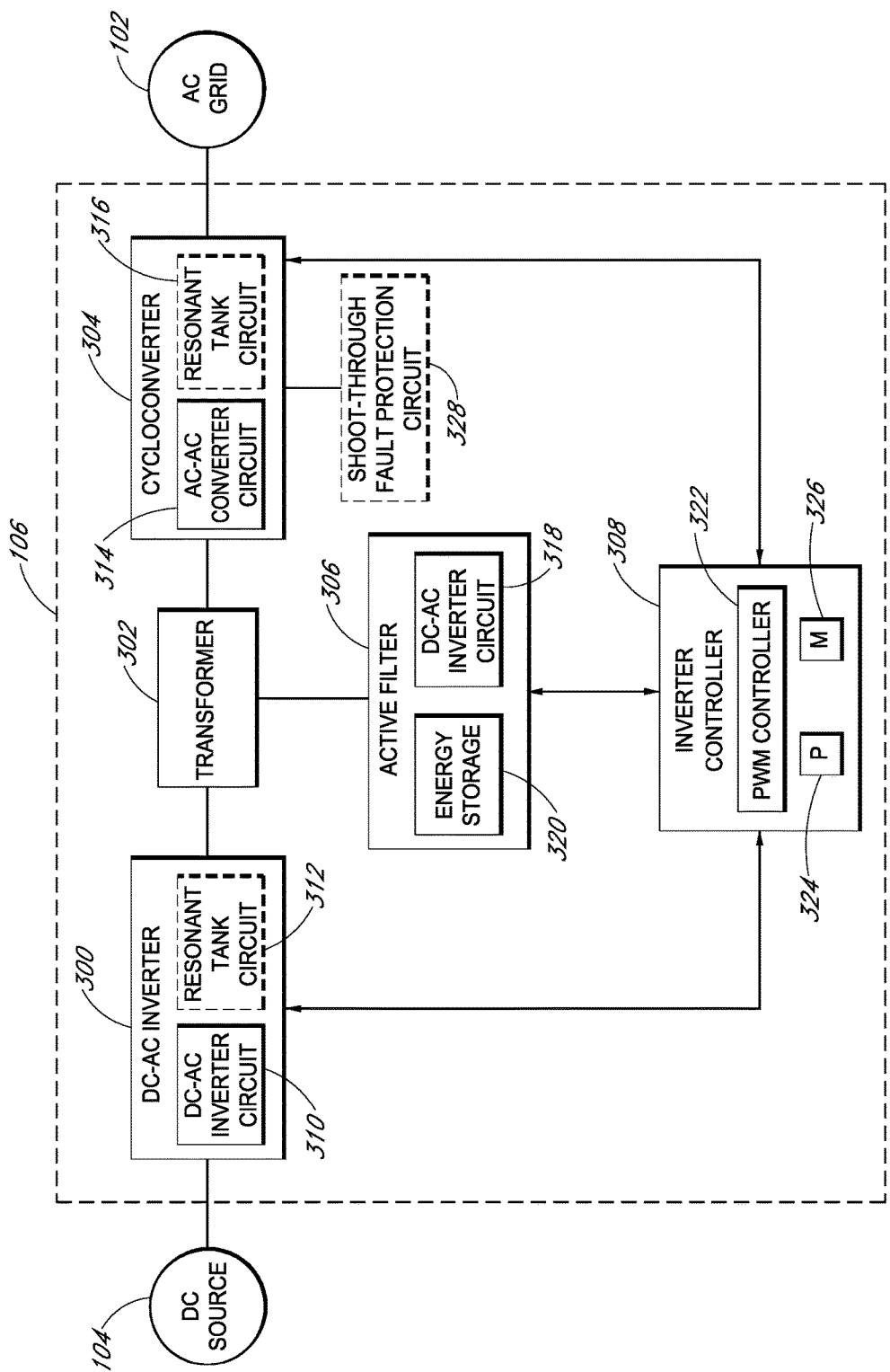
FIG. 3 is a simplified block diagram of at least one embodiment of an inverter of the system of FIG. 1.

Referring now to FIG. 3, in some embodiments, the inverter 106 includes a DC-AC inverter 300, a transformer 302, a cycloconverter 304, and an active filter 306. Depending on the particular embodiment, the transformer 302 may be embodied as a three-winding transformer that includes a first winding, a second winding, and a third winding (see, for example, FIGS. 4 and 7-11) or a two-winding transformer that includes a first winding and a second winding (see, for example, FIGS. 5-6 and 12-13). Although the transformer 302 may be described herein as a two-winding transformer or a three-winding transformer, it should be appreciated that such transformers may include more than two or three windings, respectively, in some embodiments. For example, in various embodiments, a three-winding transformer may include three windings, four windings, five windings, or a greater number of windings.

The DC-AC inverter 300 is electrically coupled to the first winding (not shown) of the transformer 302 and is electrically couplable to the DC source 104. As shown in FIG. 3, the DC-AC inverter 300 includes a DC-AC inverter circuit 310 and, in some embodiments, may include a resonant tank circuit 312 or a portion thereof. The DC-AC inverter circuit 310 is adapted to convert an input DC waveform from the DC source 14 to an AC waveform delivered to the transformer 302 at the first winding. In some embodiments, the resonant tank circuit 312 includes a capacitor and an inductor. It should be appreciated that, in some embodiments, the resonant tank circuit 312 may be formed by one or more discrete capacitors (e.g., a capacitor divider) and a leakage inductance of the transformer 302 (e.g., in half-bridge inverter embodiments).

The cycloconverter 304 is electrically coupled to the second winding (not shown) of the transformer 302 and electrically couplable to the AC grid 102. As shown in FIG. 3, the cycloconverter 304 includes an AC-AC converter circuit 314 and, in some embodiments, may include a resonant tank circuit 316 (e.g., an inductor and capacitor(s)). The AC-AC converter circuit 314 is adapted to convert an AC waveform received at the second winding of the transformer 302 to the output AC waveform delivered to the AC grid 102 and having the same frequency as a waveform of the AC grid 102 (i.e., the grid frequency). That is, the cycloconverter 304 is configured to convert an input AC waveform to an output AC waveform having a frequency that is different form the input AC waveform.

Depending on the particular embodiment, the active filter 306 may be coupled to the first winding, the second winding, or the third winding (not shown) of the transformer 302. For example, in embodiments in which the transformer 302 is embodied as a three-winding transformer, the active filter 306 may be electrically coupled to the third winding of the transformer 302 (see, for example, FIG. 4), whereas in embodiments in which the transformer 302 is embodied as a two-winding transformer, the active filter 306 may be electrically coupled to the first winding or the second winding of the transformer 302 (see, for example, FIGS. 5-6). The active filter 306 is adapted to sink and source power with one or more energy storage devices 320 of the active filter 306 and using a DC-AC inverter circuit 318 based on a mismatch in power (e.g., an instantaneous mismatch in power) between the DC source 104 and the AC grid 102. That is, the active filter 306 supplies power from or absorbs power with the one or more energy storage devices 320 based on the mismatch in power.

For example, it should be appreciated that the DC source 104 delivers a relatively constant power to the DC-AC inverter 300. However, the AC grid 102 has a relatively sinusoidal power that fluctuates (e.g., between zero and peak power). When the power of the AC grid 102 is zero, the power delivered to the AC grid 102 should also be zero; accordingly, the constant power delivered by the DC source 104 is supplied to the one or more energy storage devices 320 of the active filter 306. However, when the AC grid 102 is at peak power, the power of the AC grid 102 is generally twice that of the input power from the DC source 104; as such, all of the power from the DC source 104 is delivered to the AC grid 102 and the other half of the power is supplied from the one or more energy storage devices 320 of the active filter 306. In some embodiments, the one or more energy storage devices 320 are embodied as one or more capacitors; however, the energy storage devices 320 may be embodied as other devices in other embodiments.

The inverter 106 also includes an inverter controller 308, which controls the operation of the DC-AC inverter 300, the cycloconverter 304, and the active filter 306. Although the inverter controller 308 is illustratively embodied as a single controller in the embodiment of FIG. 3, the inverter controller 308 may be embodied as multiple separate controllers in other embodiments. For example, in some embodiments, the inverter 106 may include an input controller to control the operation of the DC-AC inverter 300, an output controller to control the operation of the cycloconverter 304, and/or a filter controller to control the operation of the active filter 306. In such embodiments, each of the controllers may be galvanically isolated from one another.

As discussed above, the inverter controller 308 is electrically coupled to and adapted to control operation of the DC-AC inverter 300, the cycloconverter 304, and the active filter 306. To do so, the inverter controller 308 may provide a plurality of switching and/or control signals to various circuits of the DC-AC inverter 300, the cycloconverter 304, and the active filter 306. For example, in some embodiments, the inverter controller 308 controls the operation of the DC-AC inverter 300 based on a global maximum power point tracking ("MPPT") method. As shown in FIG. 3, the illustrative inverter controller 308 includes a pulse width modulation ("PWM") controller 322 that utilizes a PWM algorithm to control various switches of the inverter 106 described in greater detail below. To do so, the PWM controller 322 may provide a plurality of switching and/or control signals to various circuits of the inverter 106. It should be appreciated that, in some embodiments, the inverter controller 308 is adapted to control switching cycles of the various electrical switches of the DC-AC inverter 300, the cycloconverter 304, and/or the active filter 306 using zero-voltage switching techniques.

The inverter controller 308 may include a processor 324 and a memory 326, both of which may be integrated into a single integrated circuit or as separate integrated circuits connected via wires on a printed circuit board. The processor 324 may execute instructions stored on the memory 326 and cause the inverter controller 308 to perform various actions to control the DC-AC inverter 300, the cycloconverter 304, and/or the active filter 306. The memory 326 may be any of a number of known tangible storage mediums (e.g., RAM, DRAM, SRAM, ROM, EEPROM, flash memory, etc.).

In some embodiments, as described in greater detail below with regard to FIGS. 16-17, the inverter 106 may include a shoot-through fault protection circuit 328 electrically coupled to the cycloconverter 304 and configured to detect and manage shoot-through faults. In particular, the shoot-through fault protection circuit 328 may be adapted to determine whether a current sensed in the cycloconverter 304 exceeds a current threshold value and limit the current in response to a determination that the current exceeds the current threshold value. For example, the shoot-through fault protection circuit 328 may override control gate signals of the cycloconverter 304 and force the electrical switches of the cycloconverter 304 to a passive state. Although the shoot-through fault protection circuit 328 is described herein as being electrically coupled to the cycloconverter 304, it should be appreciated that the shoot-through fault protection circuit 328 may be electrically coupled to the DC-AC inverter 300, the active filter 306, and/or another component of the inverter 106 in other embodiments. Further, in some embodiments, the inverter 106 may include multiple shoot-through fault protection circuits 328.

Additionally, in some embodiments, the inverter 106 may include circuits not shown herein for clarity of the description. For example, the inverter 106 may include communication circuitry, which may be communicatively coupled to the inverter controller 308 or may be incorporated therein. In such embodiments, the inverter controller 308 may utilize the communication circuitry to communicate with remote devices, such as remote controllers or servers. For example, depending on the particular embodiment, the communication circuitry may be configured to communicate with remote devices over an AC power line, such as the AC power line interconnects coupled to the output of the cycloconverter 304, or using other communication technologies and/or protocols. For example, in some embodiments, the communication circuitry may be embodied as a wireless or wired communication circuit configured to communicate with remote devices utilizing one or more wireless or wired communication technologies and/or protocols such as Wi-Fi™, Zigbee®, ModBus®, WiMAX, Wireless USB, Bluetooth®, TCP/IP, USB, CAN-bus, HomePNA™, and/or other wired or wireless communication technology and/or protocol. Further, in some embodiments, the inverter 106 may include an input filter electrically coupled (e.g., in series) with the DC source 104 and/or an output filter electrically coupled (e.g., in series) with the AC grid 102.

Figure 4:
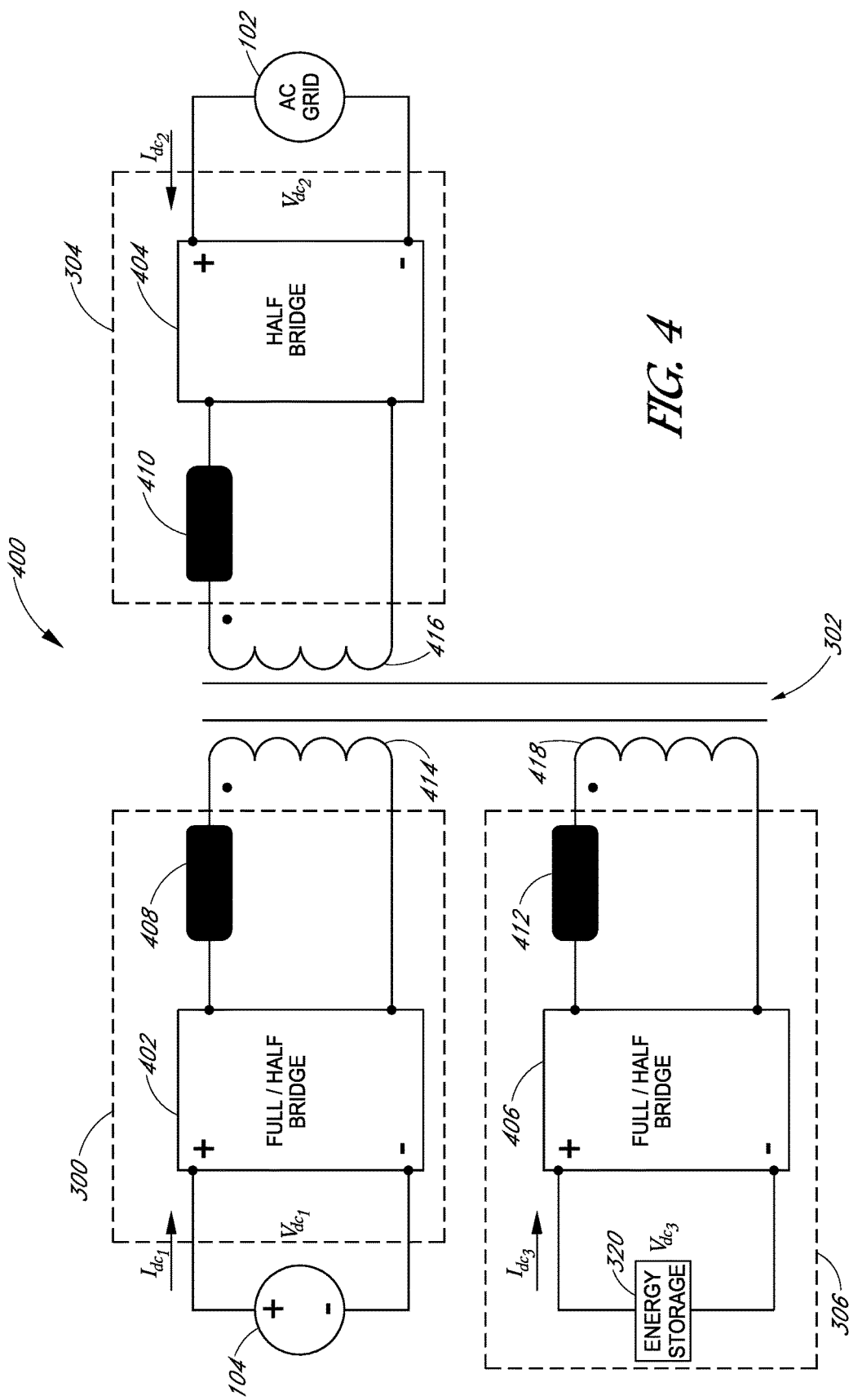
FIGS. 4-13 are simplified electrical schematics of various embodiments of the inverter of FIG. 3.

Referring now to FIG. 4, a multi-port resonant converter topology in which the inverter 106 is embodied as a three-port inverter 400 and includes a three-winding transformer 302 is shown. The illustrative inverter 400 of FIG. 4 includes a set of full and/or half bridge converter circuits 402, 404, 406 and a set of impedances 408, 410, 412. As shown, in the illustrative embodiment, the converter circuit 402 and the impedance 408 form the DC-AC inverter 300, the converter circuit 404 and the impedance 410 form the cycloconverter 304, and the converter circuit 406, the impedance 412, and the energy storage device 320 form the active filter 306. As shown and described above, the DC-AC inverter 300 is electrically coupled to a first winding 414 of the transformer 302, the cycloconverter 304 is electrically coupled to a second winding 416 of the transformer 302, and the active filter 306 is electrically coupled to a third winding 418 of the transformer 302.

The converter circuit 402 is embodied as the DC-AC inverter circuit 310 and, depending on the particular embodiment, may be embodied as a half-bridge inverter circuit (not shown) or a full-bridge inverter circuit (see, for example, FIGS. 7-11). Similarly, the converter circuit 406 is embodied as the DC-AC inverter circuit 318, which depending on the particular embodiment, may be embodied as a half-bridge inverter circuit or a full-bridge inverter circuit. The illustrative converter circuit 404 is embodied as the AC-AC converter circuit 314 in a half-bridge configuration. The impedances 408, 410 may be a result of, or otherwise be associated with, a portion of the resonant tank circuits 312, 314, respectively. As such, each of the impedances 408, 410 may represent a capacitance and inductance in the corresponding resonant tank circuits 312, 314. The illustrative impedance 412 is representative of a leakage inductance from the three-winding transformer 302.

Figure 5:
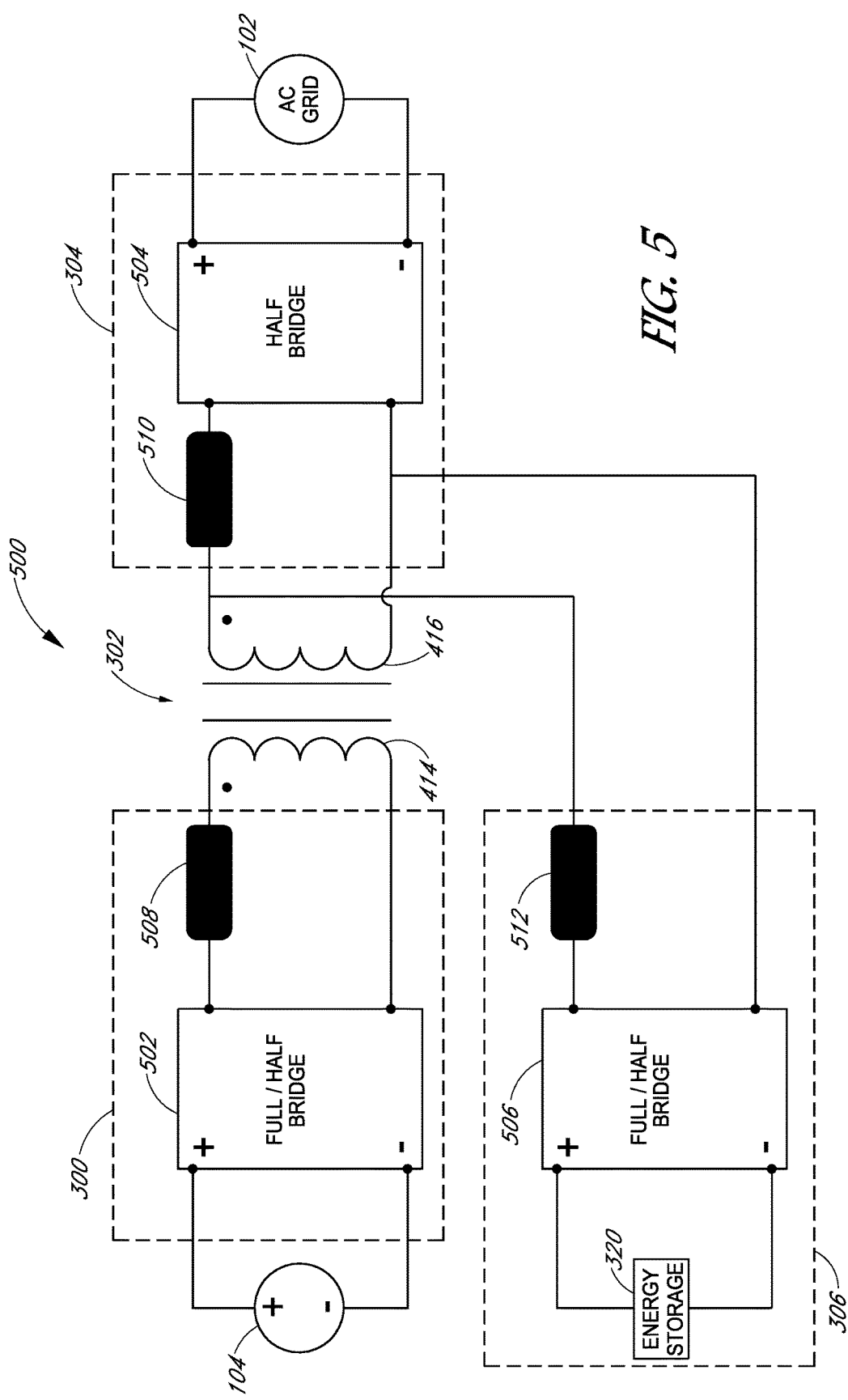

Referring now to FIG. 5, a multi-port resonant converter topology in which the inverter 106 is embodied as a three-port inverter 500 and includes a two-winding transformer 302 is shown. The illustrative inverter 500 of FIG. 5 includes a set of full and/or half bridge converter circuits 502, 504, 506 and a set of impedances 508, 510, 512. As shown, in the illustrative embodiment, the converter circuit 502 and the impedance 508 form the DC-AC inverter 300, the converter circuit 504 and the impedance 510 form the cycloconverter 304, and the converter circuit 506, the impedance 512, and the energy storage device 320 form the active filter 306. As shown and described above, the DC-AC inverter 300 is electrically coupled to the first winding 414 of the transformer 302 and the cycloconverter 304 and the active filter 306 are electrically coupled to the second winding 416 of the transformer 302.

The converter circuit 502 is embodied as the DC-AC inverter circuit 310 and, depending on the particular embodiment, may be embodied as a half-bridge inverter circuit or a full-bridge inverter circuit. Similarly, the converter circuit 506 is embodied as the DC-AC inverter circuit 318, which depending on the particular embodiment, may be embodied as a half-bridge inverter circuit or a full-bridge inverter circuit. The illustrative converter circuit 504 is embodied as the AC-AC converter circuit 314 in a half-bridge configuration. The impedances 508, 510 may be a result of, or otherwise be associated with, a portion of the resonant tank circuits 312, 314, respectively. As such, each of the impedances 508, 510 may represent a capacitance and inductance in the corresponding resonant tank circuits 312, 314. The illustrative impedance 512 may be representative of a leakage inductance from the two-winding transformer 302.

Figure 6:
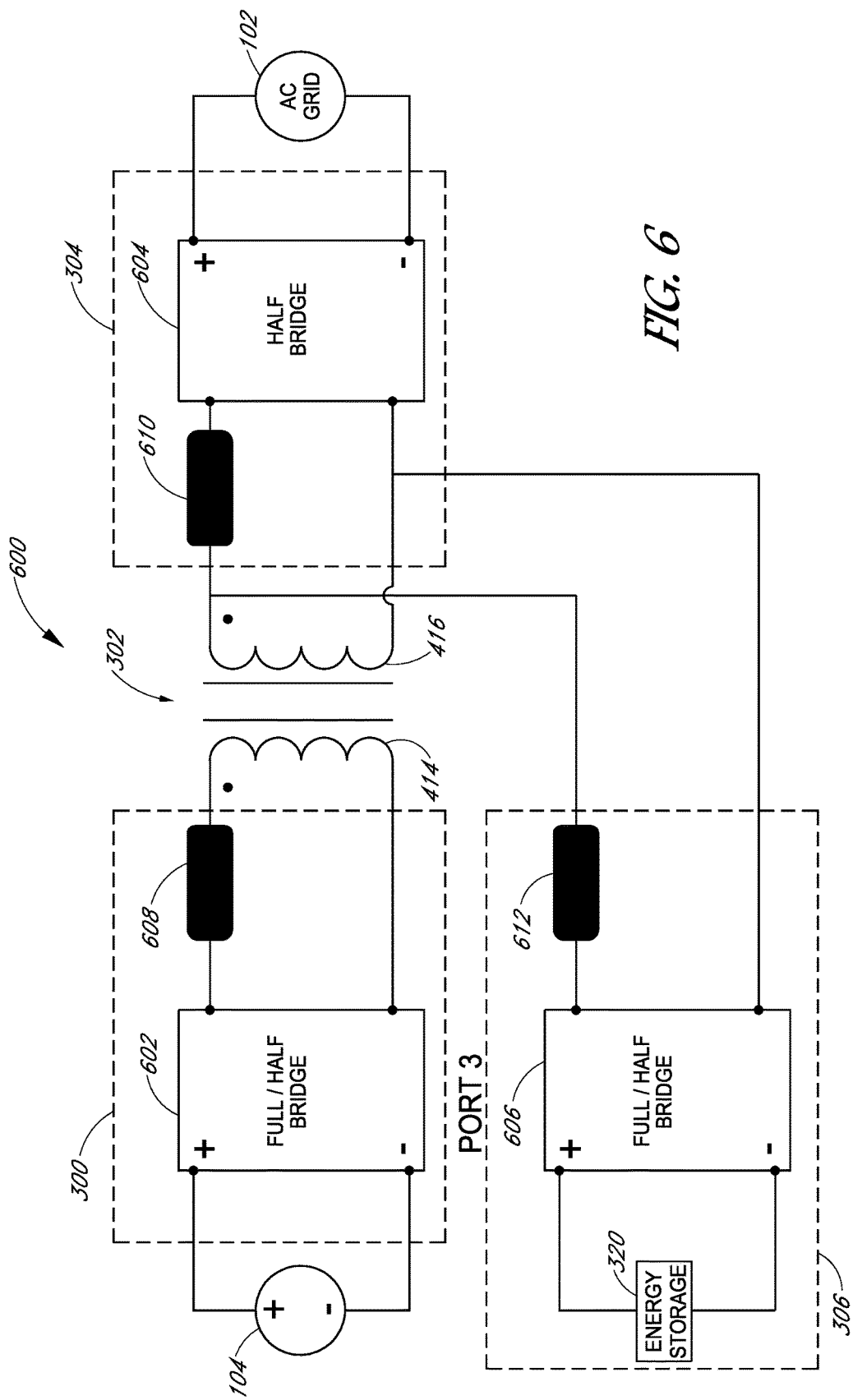

Referring now to FIG. 6, a multi-port resonant converter topology in which the inverter 106 is embodied as a three-port inverter 600 and includes a two-winding transformer 302 is shown. The illustrative inverter 600 of FIG. 6 includes a set of full and/or half bridge converter circuits 602, 604, 606 and a set of impedances 608, 610, 612. As shown, in the illustrative embodiment, the converter circuit 602 and the impedance 608 form the DC-AC inverter 300, the converter circuit 604 and the impedance 610 form the cycloconverter 304, and the converter circuit 606, the impedance 612, and the energy storage device 320 form the active filter 306. As shown and described above, the DC-AC inverter 300 and the active filter 306 are electrically coupled to the first winding 414 of the transformer 302 and the cycloconverter 304 is electrically coupled to the second winding 416 of the transformer 302.

The converter circuit 602 is embodied as the DC-AC inverter circuit 310 and, depending on the particular embodiment, may be embodied as a half-bridge inverter circuit or a full-bridge inverter circuit. Similarly, the converter circuit 606 is embodied as the DC-AC inverter circuit 318, which depending on the particular embodiment, may be embodied as a half-bridge inverter circuit or a full-bridge inverter circuit. The illustrative converter circuit 604 is embodied as the AC-AC converter circuit 314 in a half-bridge configuration. The impedances 608, 610 may be a result of, or otherwise be associated with, a portion of the resonant tank circuits 312, 314, respectively. As such, each of the impedances 608, 610 may represent a capacitance and inductance in the corresponding resonant tank circuits 312, 314. The illustrative impedance 612 may be representative of a leakage inductance from the two-winding transformer 302.

Figure 7:
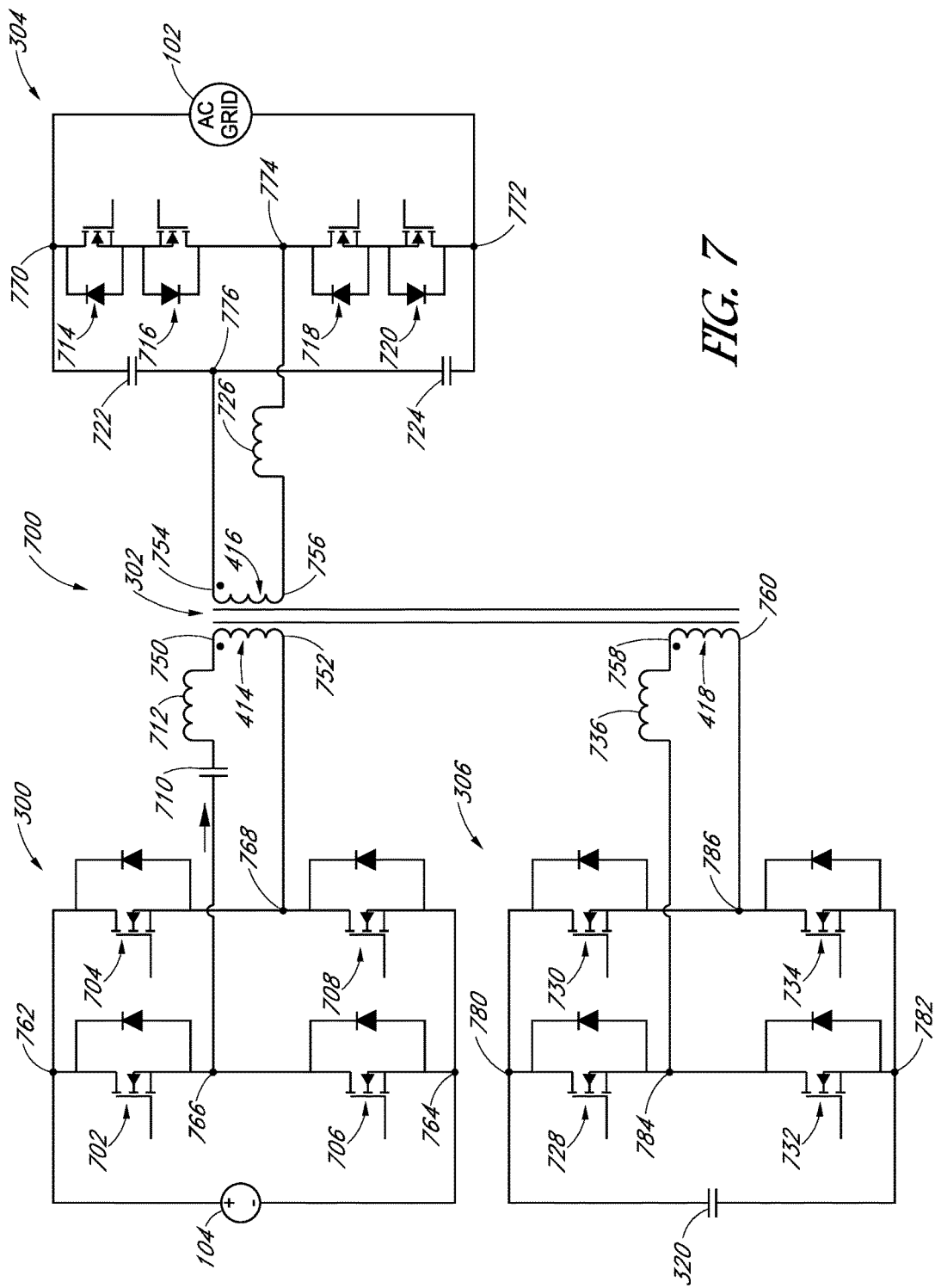

Referring now to FIGS. 7-11, in some embodiments, the inverter 106 may be embodied as a three-port inverter 700, 800, 900, 1000, 1100 having a three-winding transformer 302. As shown in FIG. 7, each of the DC-AC inverter 300 and the active filter 306 illustratively includes a full-bridge converter, and the cycloconverter 304 includes a half-bridge converter. In the illustrative embodiment, the DC-AC inverter 300 includes electrical switches 702, 704, 706, 708, a capacitor 710, and an inductor 712. The illustrative cycloconverter 304 includes electrical switches 714, 716, 718, 720, capacitors 722, 724, and an inductor 726. Further, the illustrative active filter 306 includes electrical switches 728, 730, 732, 734 and, in some embodiments, an inductance 736. The active filter 306 further includes the one or more energy storage devices 320, which is illustrated in FIG. 7 as a capacitor. As described above, the DC-AC inverter 300 is electrically coupled to the first winding 414 of the transformer 302 (at terminals 750, 752), the cycloconverter 304 is electrically coupled to the second winding 416 of the transformer 302 (at terminals 754, 756), and the active filter 306 is electrically coupled to the third winding 418 of the transformer 302 (at terminals 758, 760).

The illustrative inverter 700 is electrically coupled to the DC source 104, which is embodied as one or more photovoltaic cells, at nodes or electrical connections 762, 764. More specifically, the electrical switches 702, 704 are electrically coupled to the DC source 104 at the electrical connection 762, and the electrical switches 706, 708 are electrically coupled to the DC source 104 at the electrical connection 764. Further, the electrical switches 702, 706 are electrically coupled to one another and to the capacitor 710 at the electrical connection 766, and the electrical switches 704, 708 are electrically coupled to one another and to the terminal 752 of the transformer 302 at the electrical connection 768. Additionally, the inductor 712 is electrically coupled to the capacitor 710 and to the terminal 750 of the transformer 302 such that the capacitor 710 and the inductor 712 are electrically wired in series between the electrical connection 766 and the terminal 750.

Additionally, the illustrative inverter 700 is electrically coupled to the AC grid 102 at electrical connections 770, 772. In particular, the cycloconverter 304, which illustratively includes a set of electrical switches 714, 716, 718, 720 and a capacitor divider including the capacitors 722, 724, is electrically coupled to the AC grid 102 at the electrical connections 770, 772. More specifically, a pair of the electrical switches 714, 716 and the capacitor 722 are electrically coupled to the AC grid 102 at the electrical connection 770, and a pair of the electrical switches 718, 720 and the capacitor 724 are electrically coupled to the AC grid 102 at the electrically connection 772. It should be appreciated that each of those pairs of electrical switches is configured with the electrical switches electrically coupled "back-to-back" in series in opposing "directions" to operate, for example, as blocking switches depending on whether the power grid waveform is positive or negative at a given point in time. As shown, the electrical switches 716, 718 are electrically coupled to one another and to the inductor 726 at the electrical connection 774, and the capacitors 722, 724 are electrically coupled to one another and terminal 754 of the second winding 416 of the transformer 302 at the electrical connection 776. The inductor 726 is further electrically coupled to the terminal 756 of the second winding 416 of the transformer 302.

The active filter 306 is electrically coupled to the third winding 418 of the transformer 302. More specifically, the electrical switches 728, 730 are electrically coupled to the one or more energy storage devices 320 at the electrical connection 780, and the electrical switches 732, 734 are electrically coupled to the one or more energy storage devices 320 at the electrical connection 782. Further, the electrical switches 728, 732 are electrically coupled to one another and to the terminal 758 of the third winding 418 of the transformer 302 at the electrical connection 784, and the electrical switches 730, 734 are electrically coupled to one another and to the terminal 760 of the third winding 418 of the transformer 302 at the electrical connection 786. Although the inductance 736 is represented in series between the electrical connection 784 and the terminal 758 in FIG. 7, it should be appreciated that the inductance 736 is a leakage inductance from the transformer 302 and, therefore, not a discrete inductor. However, the inductance 736 may alternatively, or additionally, be a result of a discrete inductor in other embodiments.

Figure 8:
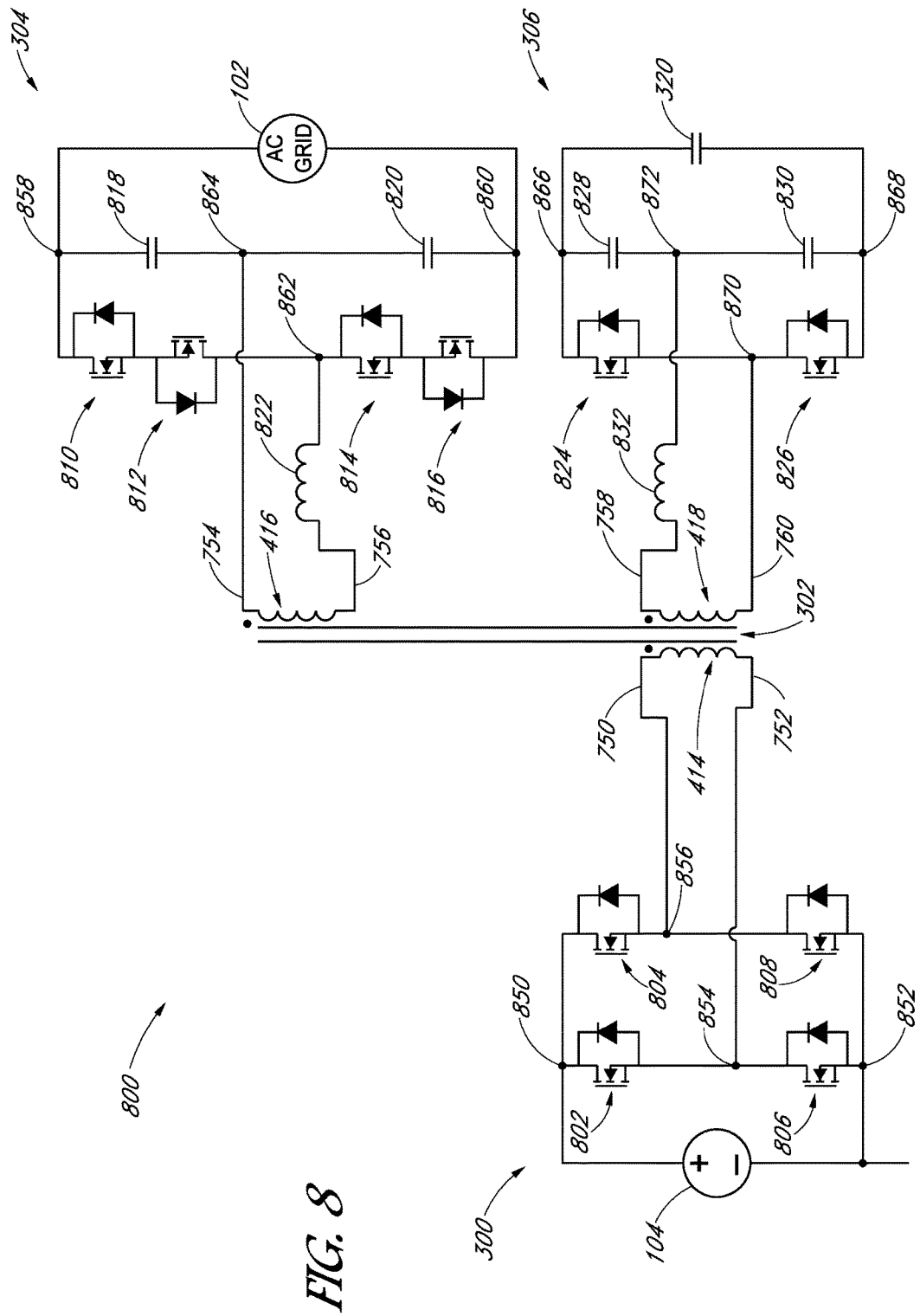

Referring now to FIG. 8, the DC-AC inverter 300 of the three-port inverter 800 illustratively includes a full-bridge converter, and each of the cycloconverter 304 and the active filter 306 includes a half-bridge converter. As shown, the illustrative DC-AC inverter 300 includes electrical switches 802, 804, 806, 808. Further, the illustrative cycloconverter 304 includes electrical switches 810, 812, 814, 816, capacitors 818, 820, and an inductor 822. The illustrative active filter 306 includes electrical switches 824, 826, capacitors 828, 830, and an inductance 832. The active filter 306 further includes the one or more energy storage devices 320, which is illustrated in FIG. 8 as a capacitor.

The illustrative inverter 800 is electrically coupled to the DC source 104 at electrical connections 850, 852. More specifically, the electrical switches 802, 804 are electrically coupled to the DC source 104 at the electrical connection 850, and the electrical switches 806, 808 are electrically coupled to the DC source 104 at the electrical connection 852. Further, the electrical switches 802, 806 are electrically coupled to one another and to the terminal 752 of the transformer 302 at the electrical connection 854, and the electrical switches 804, 808 are electrically coupled to one another and to the terminal 750 of the transformer 302 at the electrical connection 856.

The inverter 800 is electrically coupled to the AC grid 102 at electrical connections 858, 860. In particular, the cycloconverter 304, which illustratively includes a set of electrical switches 810, 812, 814, 816 and a capacitor divider including the capacitors 818, 820, is electrically coupled to the AC grid 102 at the electrical connections 858, 860. More specifically, a pair of the electrical switches 810, 812 and the capacitor 818 are electrically coupled to the AC grid 102 at the electrical connection 858, and a pair of the electrical switches 814, 816 and the capacitor 820 are electrically coupled to the AC grid 102 at the electrically connection 860. It should be appreciated that each of those pairs of electrical switches is configured with the electrical switches electrically coupled "back-to-back" in series in opposing "directions" to operate, for example, as blocking switches depending on whether the power grid waveform is positive or negative at a given point in time. As shown, the electrical switches 812, 814 are electrically coupled to one another and to the inductor 822 at the electrical connection 862, and the capacitors 818, 820 are electrically coupled to one another and to the terminal 754 of the second winding 416 of the transformer 302 at the electrical connection 864. The inductor 822 is further electrically coupled to the terminal 756 of the second winding 416 of the transformer 302.

The active filter 306 is electrically coupled to the third winding 418 of the transformer 302. In particular, the DC-AC inverter circuit 318 illustratively including a pair of electrical switches 824, 826 and a capacitor divider including the capacitors 828, 830 is electrically coupled to the at least one energy storage devices 320 (represented as a capacitor) at the electrical connections 866, 868. More specifically, the electrical switch 824 and the capacitor 828 are electrically coupled to the energy storage device 320 at the electrical connection 866, and the electrical switch 826 and the capacitor 830 are electrically coupled to the energy storage device 320 at the electrical connection 868. Further, the electrical switches 824, 826 are electrically coupled to one another and to the terminal 760 of the third winding 418 of the transformer 302 at the electrical connection 870, and the capacitors 828, 830 are electrically coupled to one another and to the terminal 758 of the transformer 302 at the electrical connection 872. Although the inductance 832 is represented between the electrical connection 872 and the terminal 758 in FIG. 8, it should be appreciated that the inductance 832 is a leakage inductance from the transformer 302 and, therefore, not a discrete inductor. However, the inductance 832 may alternatively, or additionally, be a result of a discrete inductor in other embodiments.

Figure 9:
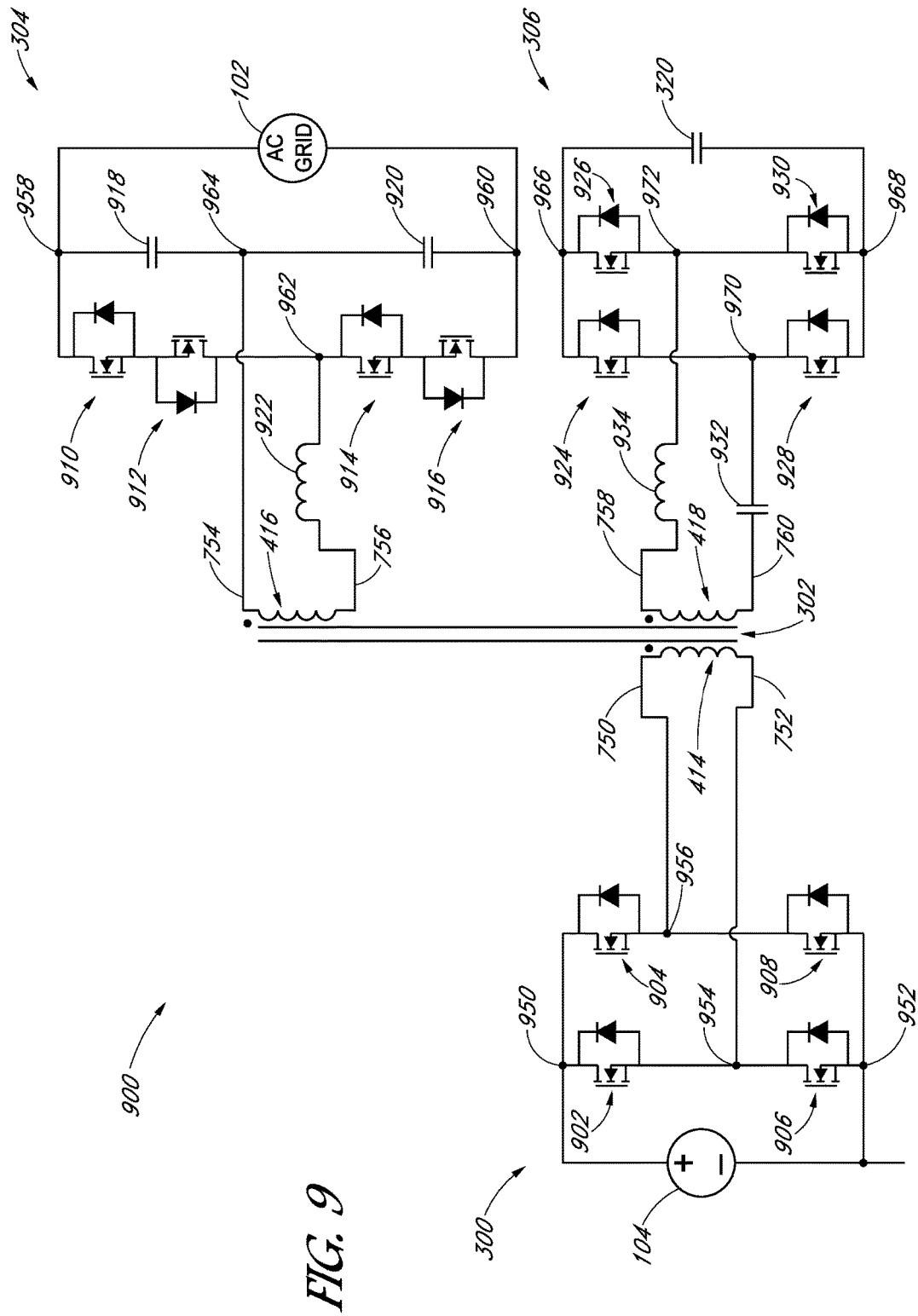

Referring now to FIG. 9, each of the DC-AC inverter 300 and the active filter 306 of the three-port inverter 900 illustratively includes a full-bridge converter, and the cycloconverter 304 includes a half-bridge converter. In the illustrative embodiment, the DC-AC inverter 300 includes electrical switches 902, 904, 906, 908, and the illustrative cycloconverter 304 includes electrical switches 910, 912, 914, 916, capacitors 918, 920, and an inductor 922. Further, the illustrative active filter 306 includes electrical switches 924, 926, 928, 930, a capacitor 932, and an inductance 934. The active filter 306 further includes the one or more energy storage devices 320, which is illustrated in FIG. 9 as a capacitor.

The illustrative inverter 900 is electrically coupled to the DC source 104 electrical connections 950, 952. More specifically, the electrical switches 902, 904 are electrically coupled to the DC source 104 at the electrical connection 950, and the electrical switches 906, 908 are electrically coupled to the DC source 104 at the electrical connection 952. Further, the electrical switches 902, 906 are electrically coupled to one another and to the terminal 752 of the transformer 302 at the electrical connection 954, and the electrical switches 904, 908 are electrically coupled to one another and to the terminal 750 of the transformer 302 at the electrical connection 956.

Additionally, the illustrative inverter 900 is electrically coupled to the AC grid 102 at electrical connections 958, 960. In particular, the cycloconverter 304, which illustratively includes a set of electrical switches 910, 912, 914, 916 and a capacitor divider including the capacitors 918, 920, is electrically coupled to the AC grid 102 at the electrical connections 958, 960. More specifically, a pair of the electrical switches 910, 912 and the capacitor 918 are electrically coupled to the AC grid 102 at the electrical connection 958, and a pair of the electrical switches 914, 916 and the capacitor 920 are electrically coupled to the AC grid 102 at the electrically connection 960. It should be appreciated that each of those pairs of electrical switches is configured with the electrical switches electrically coupled "back-to-back" in series in opposing "directions" to operate, for example, as blocking switches depending on whether the power grid waveform is positive or negative at a given point in time. As shown, the electrical switches 912, 914 are electrically coupled to one another and to the inductor 922 at the electrical connection 962, and the capacitors 918, 920 are electrically coupled to one another and to the terminal 754 of the second winding 416 of the transformer 302 at the electrical connection 964. The inductor 922 is further electrically coupled to the terminal 756 of the second winding 416 of the transformer 302.

The active filter 306 is electrically coupled to the third winding 418 of the transformer 302. More specifically, the electrical switches 924, 926 are electrically coupled to the one or more energy storage devices 320 at the electrical connection 966, and the electrical switches 928, 930 are electrically coupled to the one or more energy storage devices 320 at the electrical connection 968. Further, the electrical switches 924, 926 are electrically coupled to one another and to the capacitor 932 at the electrical connection 970, and the electrical switches 926, 930 are electrically coupled to one another and to the terminal 758 of the third winding 418 of the transformer 302 at the electrical connection 972. Although the inductance 934 is represented in series between the electrical connection 972 and the terminal 758 in FIG. 9, it should be appreciated that the inductance 934 is a leakage inductance from the transformer 302 and, therefore, not a discrete inductor. However, the inductance 934 may alternatively, or additionally, be a result of a discrete inductor in other embodiments. It should be appreciated that, in some embodiments, the capacitor 932 and the inductance (e.g., leakage inductance and/or discrete inductor) may form a resonant tank circuit.

Figure 10:
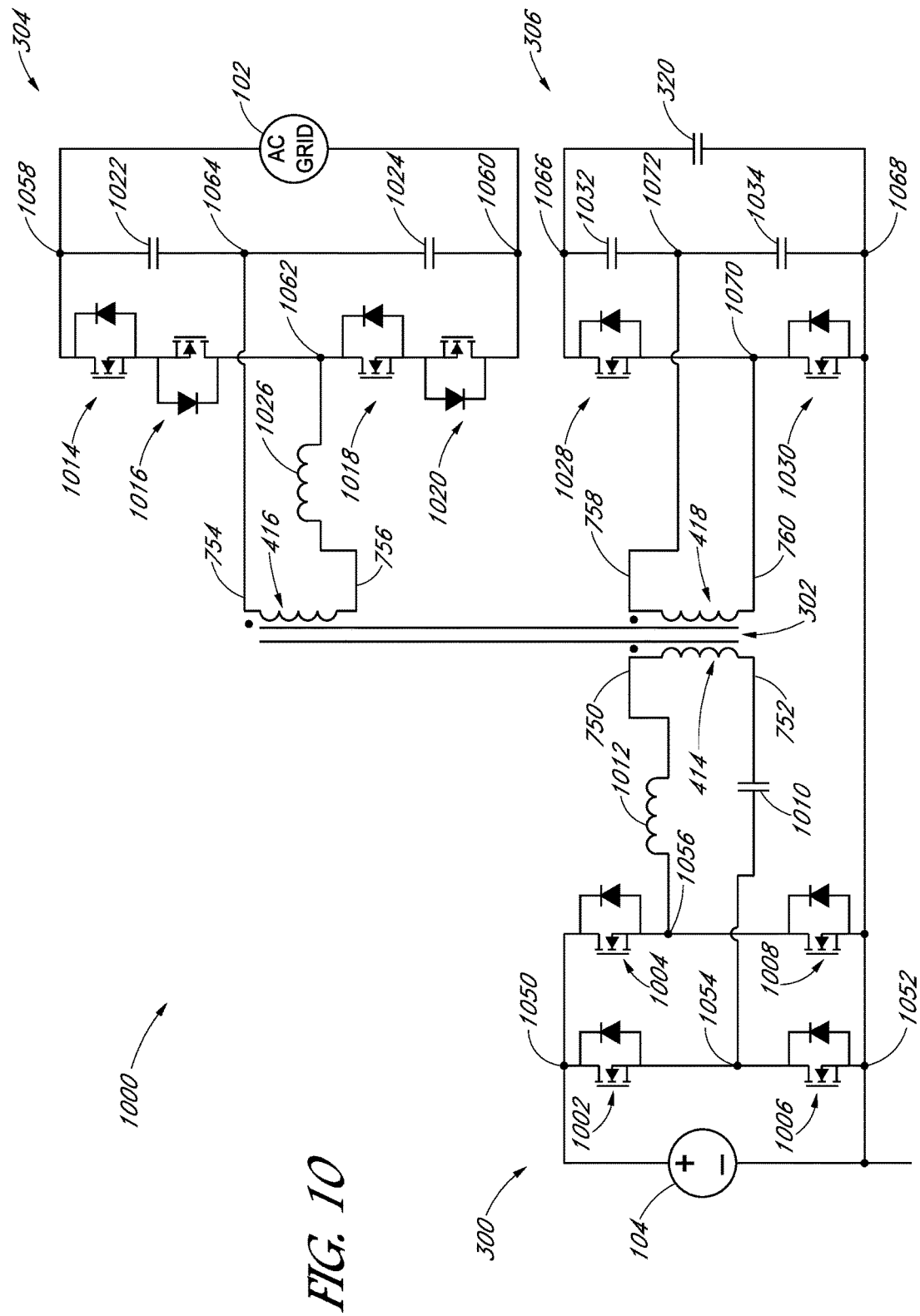

Referring now to FIG. 10, the DC-AC inverter 300 of the three-port inverter 1000 illustratively includes a full-bridge converter, and each of the cycloconverter 304 and the active filter 306 includes a half-bridge converter. As shown, the illustrative DC-AC inverter 300 includes electrical switches 1002, 1004, 1006, 1008, a capacitor 1010, and an inductor 1012. Further, the illustrative cycloconverter 304 includes electrical switches 1014, 1016, 1018, 1020, capacitors 1022, 1024, and an inductor 1026. The illustrative active filter 306 includes electrical switches 1028, 1030 and capacitors 1032, 1034. The active filter 306 further includes the one or more energy storage devices 320, which is illustrated in FIG. 10 as a capacitor.

The illustrative inverter 1000 is electrically coupled to the DC source 104 at electrical connections 1050, 1052. More specifically, the electrical switches 1002, 1004 are electrically coupled to the DC source 104 at the electrical connection 1050, and the electrical switches 1006, 1008 are electrically coupled to the DC source 104 at the electrical connection 1052. Further, the electrical switches 1002, 1006 are electrically coupled to one another and to the capacitor 1010 at the electrical connection 1054, and the electrical switches 1004, 1008 are electrically coupled to one another and to the inductor 1012 at the electrical connection 1056. The capacitor 1010 is further electrically coupled to the terminal 752 of the transformer 302 and the inductor 1012 is electrically coupled to the terminal 750 of the transformer 302.

The inverter 1000 is electrically coupled to the AC grid 102 at electrical connections 1058, 1060. In particular, the cycloconverter 304, which illustratively includes a set of electrical switches 1014, 1016, 1018, 1020 and a capacitor divider including the capacitors 1022, 1024, is electrically coupled to the AC grid 102 at the electrical connections 1058, 1060. More specifically, a pair of the electrical switches 1014, 1016 and the capacitor 1022 are electrically coupled to the AC grid 102 at the electrical connection 1058, and a pair of the electrical switches 1018, 1020 and the capacitor 1024 are electrically coupled to the AC grid 102 at the electrically connection 1060. It should be appreciated that each of those pairs of electrical switches is configured with the electrical switches electrically coupled "back-to-back" in series in opposing "directions" to operate, for example, as blocking switches depending on whether the power grid waveform is positive or negative at a given point in time. As shown, the electrical switches 1016, 1018 are electrically coupled to one another and to the inductor 1026 at the electrical connection 1062, and the capacitors 1022, 1024 are electrically coupled to one another and to the terminal 754 of the second winding 416 of the transformer 302 at the electrical connection 1064. The inductor 1026 is further electrically coupled to the terminal 756 of the second winding 416 of the transformer 302.

The active filter 306 is electrically coupled to the third winding 418 of the transformer 302. In particular, the DC-AC inverter circuit 318 illustratively including a pair of electrical switches 1028, 1030 and a capacitor divider including the capacitors 1032, 1034 is electrically coupled to the at least one energy storage devices 320 (represented as a capacitor) at the electrical connections 1066, 1068. More specifically, the electrical switch 1028 and the capacitor 1032 are electrically coupled to the energy storage device 320 at the electrical connection 1066, and the electrical switch 1030 and the capacitor 1034 are electrically coupled to the energy storage device 320 at the electrical connection 1068. Further, the electrical switches 1028, 1030 are electrically coupled to one another and to the terminal 760 of the third winding 418 of the transformer 302 at the electrical connection 1070, and the capacitors 1032, 1034 are electrically coupled to one another and to the terminal 758 of the transformer 302 at the electrical connection 1072.

Figure 11:
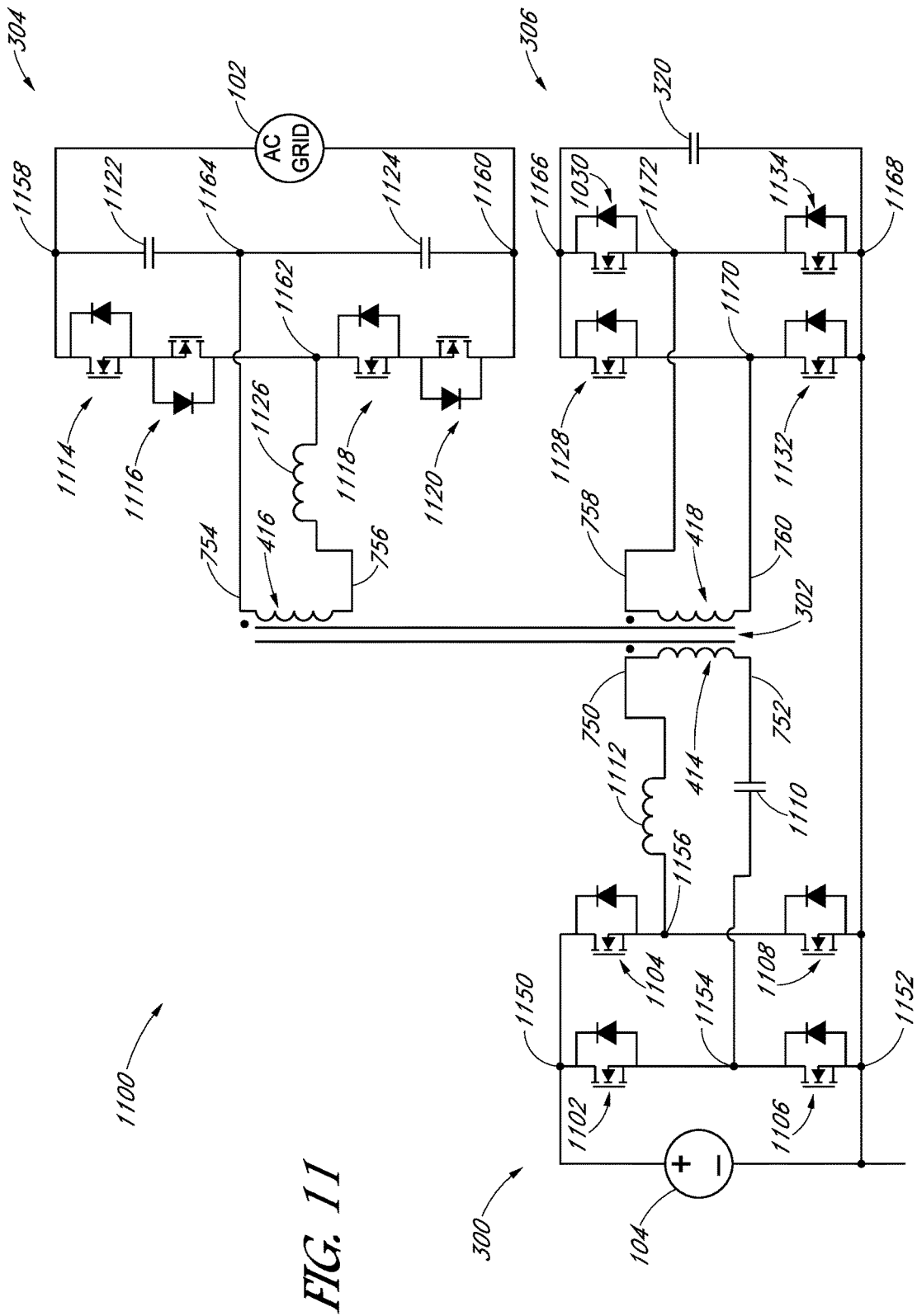

Referring now to FIG. 11, each of the DC-AC inverter 300 and the active filter 306 of the three-port inverter 1100 illustratively includes a full-bridge converter, and the cycloconverter 304 includes a half-bridge converter. In the illustrative embodiment, the DC-AC inverter 300 includes electrical switches 1102, 1104, 1106, 1108, a capacitor 1110, and an inductor 1112. The illustrative cycloconverter 304 includes electrical switches 1114, 1116, 1118, 1120, capacitors 1122, 1124, and an inductor 1126. Further, the illustrative active filter 306 includes electrical switches 1128, 1130, 1132, 1134 and the one or more energy storage devices 320.

The illustrative inverter 1100 is electrically coupled to the DC source 104 at electrical connections 1150, 1152. More specifically, the electrical switches 1102, 1104 are electrically coupled to the DC source 104 at the electrical connection 1150, and the electrical switches 1106, 1108 are electrically coupled to the DC source 104 at the electrical connection 1152. Further, the electrical switches 1102, 1106 are electrically coupled to one another and to the capacitor 1110 at the electrical connection 1154, and the electrical switches 1104, 1108 are electrically coupled to one another and to the inductor 1112 at the electrical connection 1156. The capacitor 1110 is further electrically coupled to the terminal 752 of the transformer 302 and the inductor 1112 is electrically coupled to the terminal 750 of the transformer 302.

Additionally, the illustrative inverter 1100 is electrically coupled to the AC grid 102 at electrical connections 1158, 1160. In particular, the cycloconverter 304, which illustratively includes a set of electrical switches 1114, 1116, 1118, 1120 and a capacitor divider including the capacitors 1122, 1124, is electrically coupled to the AC grid 102 at the electrical connections 1158, 1160. More specifically, a pair of the electrical switches 1114, 1116 and the capacitor 1122 are electrically coupled to the AC grid 102 at the electrical connection 1158, and a pair of the electrical switches 1118, 1120 and the capacitor 1124 are electrically coupled to the AC grid 102 at the electrically connection 1160. It should be appreciated that each of those pairs of electrical switches is configured with the electrical switches electrically coupled "back-to-back" in series in opposing "directions" to operate, for example, as blocking switches depending on whether the power grid waveform is positive or negative at a given point in time. As shown, the electrical switches 1116, 1118 are electrically coupled to one another and to the inductor 1126 at the electrical connection 1162, and the capacitors 1122, 1124 are electrically coupled to one another and to the terminal 754 of the second winding 416 of the transformer 302 at the electrical connection 1164. The inductor 1126 is further electrically coupled to the terminal 756 of the second winding 416 of the transformer 302.

The active filter 306 is electrically coupled to the third winding 418 of the transformer 302. More specifically, electrical switches 1128, 1130 are electrically coupled to the one or more energy storage devices 320 at the electrical connection 1166, and the electrical switches 1132, 1134 are electrically coupled to the one or more energy storage devices 320 at the electrical connection 1168. Further, the electrical switches 1128, 1132 are electrically coupled to one another and to the terminal 760 of the transformer 302 at the electrical connection 1170, and the electrical switches 1130, 1134 are electrically coupled to one another and to the terminal 758 of the transformer 302 at the electrical connection 1172.

Figure 12:
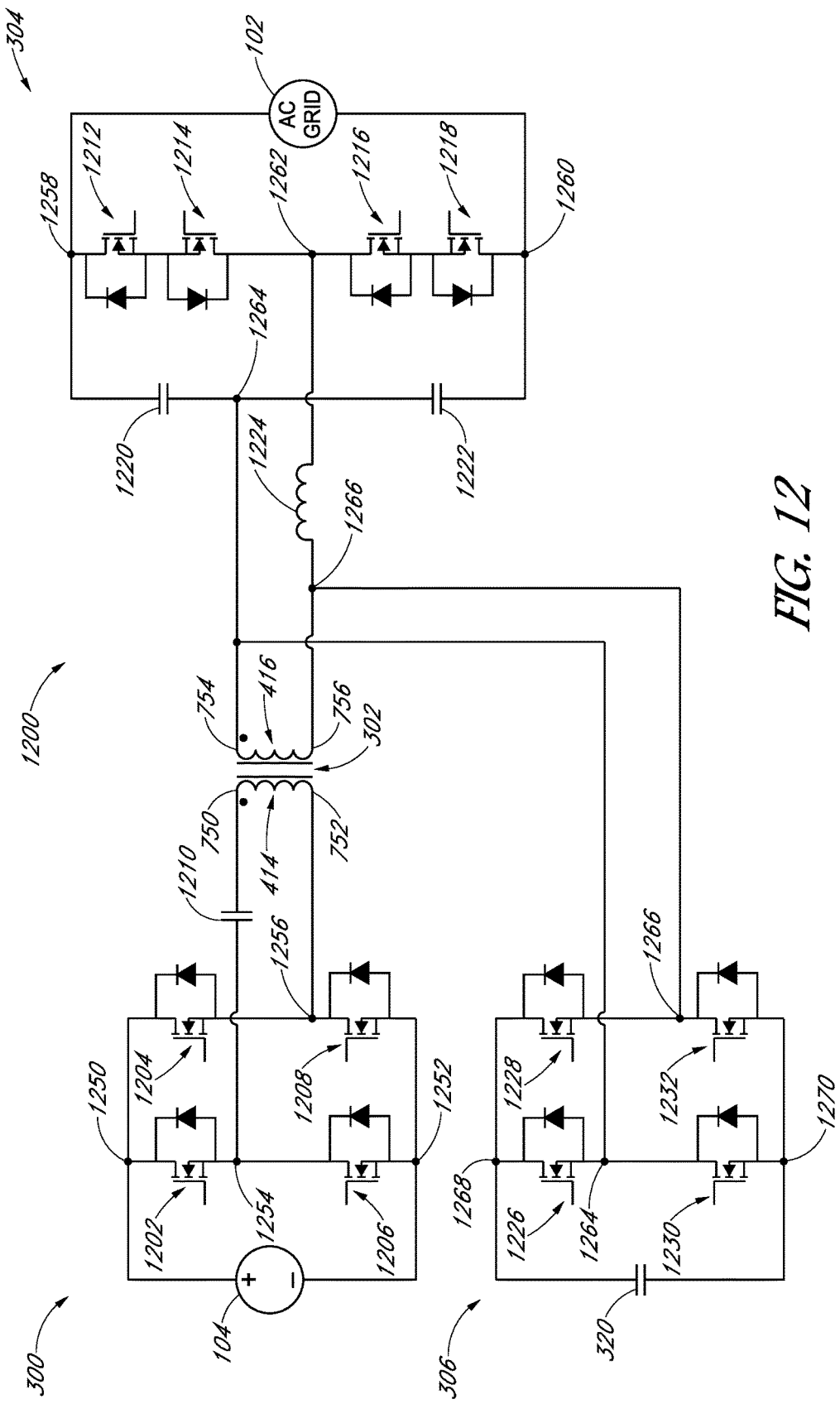
Figure 13:
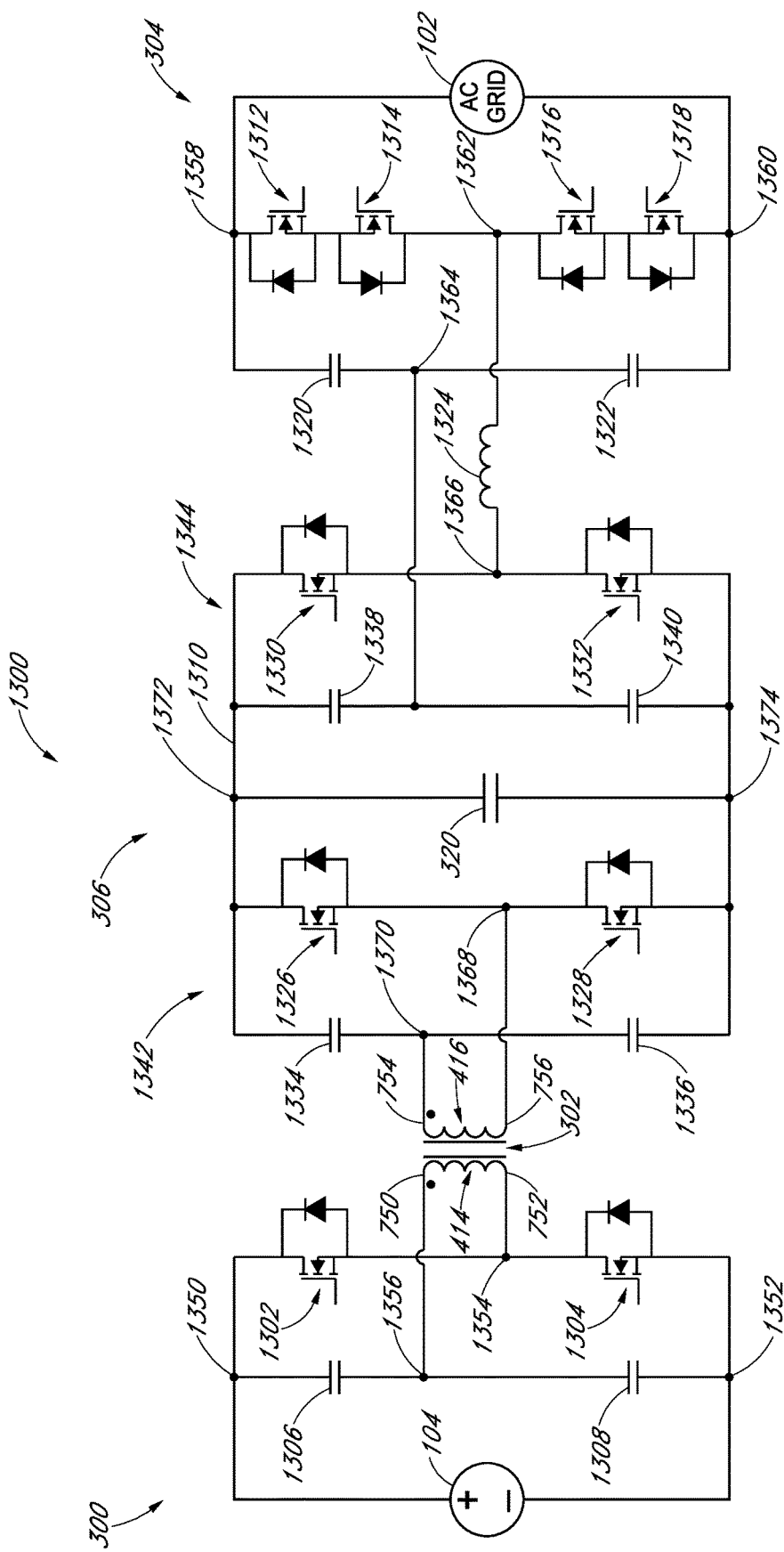

Referring now to FIGS. 12-13, in some embodiments, the inverter 106 may be embodied as a three-port inverter 1200, 1300 having a two-winding transformer 302. In particular, the inverter 1200 illustrates an embodiment of the inverter 106 in which the cycloconverter 304 and the active filter 306 are electrically coupled to the same winding 416 of the transformer 302. The inverter 1300 illustrates an embodiment of the inverter 106 in which the DC-AC inverter 300 is decoupled from the cycloconverter 304, which may allow for more optimal operation and the input and output switching frequencies may be different. It should be appreciated that the two-winding transformer 302 topologies may reduce the complexity and, therefore, cost associated with manufacturing the transformer 302 compared to the three-winding transformer 302 topologies described above.

As shown in FIG. 12, the DC-AC inverter 300 includes electrical switches 1202, 1204, 1206, 1208 and a capacitor 1210. The cycloconverter 304 includes electrical switches 1212, 1214, 1216, 1218, capacitors 1220, 1222, and an inductor 1224. Further, the active filter 306 includes electrical switches 1226, 1228, 1230, 1232 and the one or more energy storage devices 320, which is illustrated in FIG. 12 as a capacitor. As described above, the DC-AC inverter 300 is electrically coupled to the first winding 414 of the transformer 302 (at terminals 750, 752). Additionally, each of the cycloconverter 304 and the active filter 306 is electrically coupled to the second winding 416 of the transformer 302 (at terminals 754, 756). In other embodiments, the DC-AC inverter 300 and the active filter 306 may be electrically coupled to the first winding 414 and the cycloconverter 304 may be electrically coupled to the second winding 416 (see, for example, the inverter 600 of FIG. 6).

The illustrative inverter 1200 is electrically coupled to the DC source 104 at electrical connections 1250, 1252. More specifically, the electrical switches 1201, 1204 are electrically coupled to the DC source 104 at the electrical connection 1250, and the electrical switches 1206, 1208 are electrically coupled to the DC source 104 at the electrical connection 1252. Further, the electrical switches 1202, 1206 are electrically coupled to one another and to the capacitor 1210 at the electrical connection 1254, and the electrical switches 1204, 1208 are electrically coupled to one another and to the terminal 752 of the first winding 414 of the transformer 302 at the electrical connection 1256. Further, the capacitor 1210 is electrically coupled to the electrical connection 1254 and to the terminal 750.

The inverter 1200 is electrically coupled to the AC grid 102 at electrical connections 1258, 1260. More specifically, a pair of the electrical switches 1212, 1214 and the capacitor 1220 are electrically coupled to the AC grid 102 at the electrical connection 1258, and a pair of the electrical switches 1216, 1218 and the capacitor 1222 are electrically coupled to the AC grid 102 at the electrically connection 1260. It should be appreciated that each of those pairs of electrical switches is configured with the electrical switches electrically coupled "back-to-back" in series in opposing "directions" to operate, for example, as blocking switches depending on whether the power grid waveform is positive or negative at a given point in time. As shown, the electrical switches 1214, 1216 are electrically coupled to one another and to the inductor 1224 at the electrical connections 1262, and the capacitors 1220, 1222 are electrically coupled to one another and to the terminal 754 of the second winding 416 of the transformer 302 at the electrical connection 1264. The inductor 1224 is further electrically coupled to the terminal 756 of the second winding 416 of the transformer 302 at the electrical connection 1266

The active filter 306 is electrically coupled to the second winding 416 of the transformer 302. More specifically, the electrical switches 1226, 1228 are electrically coupled to the energy storage device 320 at the electrical connection 1268, and the electrical switches 1230, 1232 are electrically coupled to the energy storage device 320 at the electrical connection 1270. Further, the electrical switches 1226, 1230 are electrically coupled to one another and to the terminal 754 of the transformer 302 at the electrical connection 1264, and the electrical switches 1228, 1232 are electrically coupled to one another and to the terminal 756 of the transformer 302 and the inductor 1224 at the electrical connection 1266.

Referring now to FIG. 13, the DC-AC inverter 300 of the inverter 1300 is decoupled from the cycloconverter 304 by virtue of the active filter 306. As such, the illustrative embodiment, the input and output switching frequencies (e.g., of the DC-AC inverter 300 and the cycloconverter 304, respectively) may be different. Further, in such embodiments, it may always be possible to utilize soft switching or zero voltage switching. Additionally, in some embodiments, a bus voltage across a power bus 1310 may be lowered for low-power operation of the inverter 1300 or a portion of the inverter 1300.

The DC-AC inverter 300 of the inverter 1300 includes electrical switches 1302, 1304 and capacitors 1306, 1308. The cycloconverter 304 includes electrical switches 1312, 1314, 1316, 1318, capacitors 1320, 1322, and an inductor 1324. Further, the active filter 306 includes electrical switches 1326, 1328, 1330, 1332 and capacitors 1334, 1336, 1338, 1340. The active filter 306 further includes the one or more energy storage devices 320, which is illustrated in FIG. 13 as a capacitor. In some embodiments, the one or more energy storage devices 320 may be embodied as a bus capacitor electrically coupled to the power bus 1310. As described above, the DC-AC inverter 300 is electrically coupled to the first winding 414 of the transformer 302 (at terminals 750, 752) and the active filter 306 is electrically coupled to the second winding 416 of the transformer 302 (at terminals 754, 756).

The illustrative inverter 1300 is electrically coupled to the DC source 104 at electrical connections 1350, 1352. In particular, the DC-AC inverter circuit 318 illustratively including a pair of electrical switches 1302, 1304 and a capacitor divider including the capacitors 1306, 1308 is electrically coupled to the DC source 104 at the electrical connections 1350, 1352. More specifically, the electrical switch 1302 and the capacitor 1306 are electrically coupled to the DC source 104 at the electrical connection 1350, and the electrical switch 1304 and the capacitor 1308 are electrically coupled to the DC source 104 at the electrical connection 1352. Further, the electrical switches 1302, 1304 are electrically coupled to one another and to the terminal 752 of the first winding 414 of the transformer 302 at the electrical connection 1354, and the capacitors 1306, 1308 are electrically coupled to one another and to the terminal 750 of the first winding 414 of the transformer 302 at the electrical connection 1356.

The inverter 1300 is electrically coupled to the AC grid 102 at electrical connections 1358, 1360. More specifically, a pair of the electrical switches 1312, 1314 and the capacitor 1320 are electrically coupled to the AC grid 102 at the electrical connection 1358, and a pair of the electrical switches 1316, 1318 and the capacitor 1322 are electrically coupled to the AC grid 102 at the electrically connection 1360. It should be appreciated that each of those pairs of electrical switches is configured with the electrical switches electrically coupled "back-to-back" in series in opposing "directions" to operate, for example, as blocking switches depending on whether the power grid waveform is positive or negative at a given point in time. As shown, the electrical switches 1314, 1316 are electrically coupled to one another and to the inductor 1324 at the electrical connection 1362, and the capacitors 1320, 1322 are electrically coupled to one another and to the active filter 306 at the electrical connection 1364. The inductor 1324 is further electrically coupled to the active filter 306 at the electrical connection 1366.

The active filter 306 is electrically coupled to the second winding 416 of the transformer 302 and to the cycloconverter 304. In particular, the active filter 306 includes a converter 1342 having a set of electrical switches 1326, 1328 and a capacitor divider including the capacitors 1334, 1336 electrically coupled to the second winding 416 of the transformer 302, a converter 1344 having a set of electrical switches 1330, 1332 and a capacitor divider including the capacitors 1338, 1340 electrically coupled to the cycloconverter 304, and an energy storage device 320 electrically coupled to the power bus 1310 to which each of the converters 1342, 1344 is electrically coupled. More specifically, the electrical switches 1326, 1328 are electrically coupled to one another and to the terminal 756 of the second winding 416 of the transformer 302 at the electrical connection 1368, and the capacitors 1334, 1336 are electrically coupled to one another and to the terminal 754 of the second winding 416 of the transformer 302 at the electrical connection 1370. Further, the electrical switches 1330, 1332 are electrically coupled to one another and to the inductor 1324 of the cycloconverter 304 at the electrical connection 1366, and the capacitors 1338, 1340 are electrically coupled to one another and to the capacitors 1320, 1322 of the cycloconverter 304 at the electrical connection 1364. Additionally, the electrical switches 1326, 1330 and the capacitors 1334, 1338 are electrically coupled to the one or more energy storage devices 320 at an electrical connection 1372, and the electrical switches 1328, 1332 and the capacitors 1336, 1340 are electrically coupled to the one or more energy storage devices at the electrical connection 1374.

Each of the electrical switches described herein is a MOSFET in the illustrative embodiments; however, other types of transistors or electrical switches may be used in other embodiments. In some MOSFETs, the source metallization may connect N and P doped regions on the top of the 1-ET structure, forming a diode between the drain and the source of the MOSFET, which is represented as body diodes for each of the corresponding electrical switches. It should be appreciated that, in some embodiments, the inverter 106 may utilize one or more other types of transistors (e.g., bipolar junction transistors (BJT), insulated-gate bipolar transistors (IGBT), etc.) or thyristors.

Figure 14:
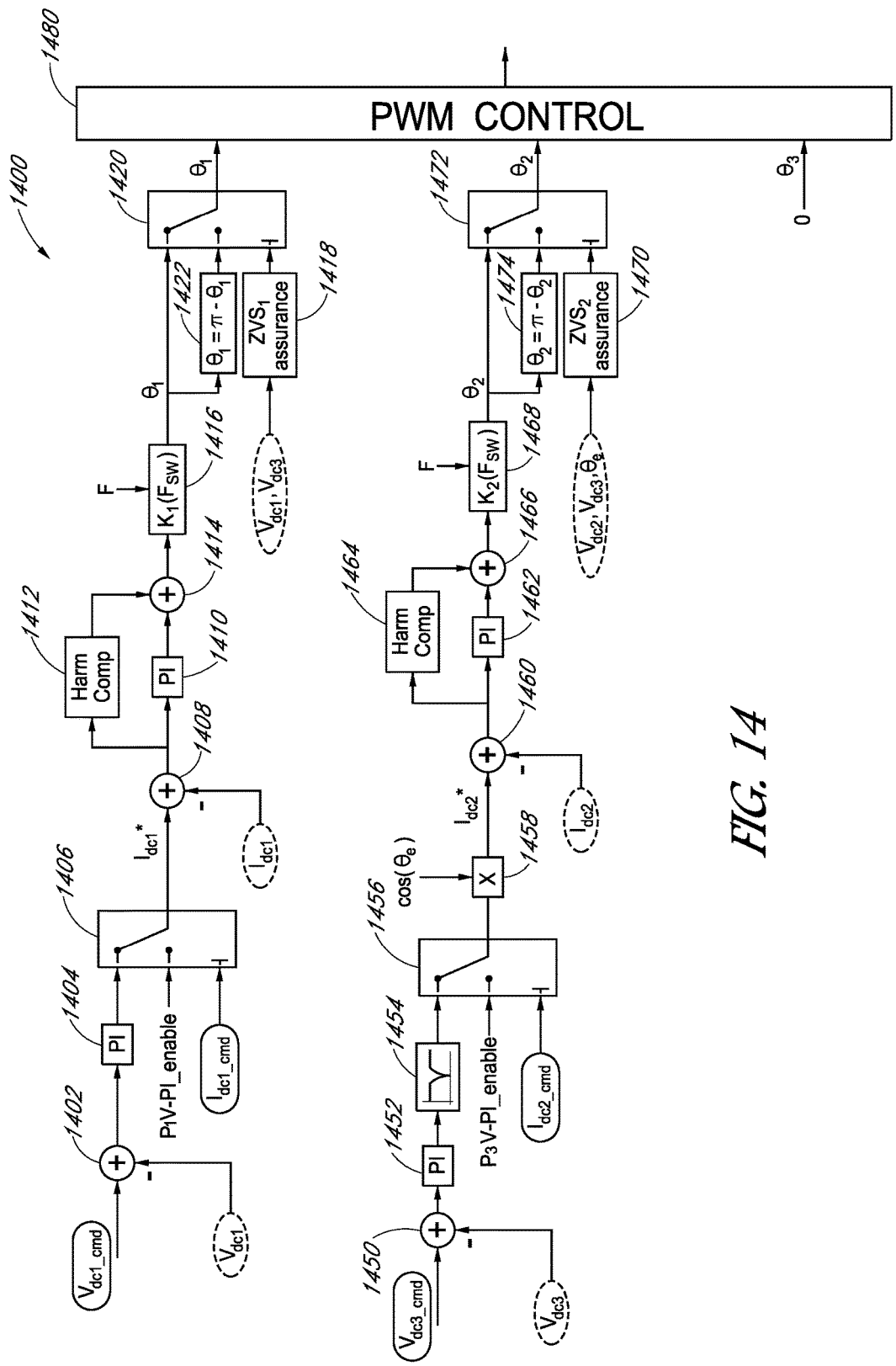
FIG. 14 is a simplified flow diagram of at least one embodiment of a method for controlling the inverter of FIG. 1.

Referring now to FIG. 14, in some embodiments, the inverter controller 308 may execute a method 1400 for closed-loop controller of the inverter 106. It should be appreciated that, in some embodiments, the method 1400 may allow for stable conversion of the power supplied by the DC source 104 to AC power injected into the AC grid 102, for example, with a near-unity power factor. In the illustrative embodiment, the controller 308 utilizes sensed voltage signals ($V_{dc_1}$, $V_{dc_2}$, and $V_{dc_3}$) and current signals ($I_{dc_1}$, $I_{dc_2}$, and $I_{dc_3}$) from the DC-AC inverter 300, the cycloconverter 304, and the active filter 306 (e.g., as shown in FIG. 4) to generate PWM actuation signals $\theta_1$, $\theta_2$, and $\theta_3$ for control of the electrical switches of the DC-AC inverter 300, the cycloconverter 304, and the active filter 306, respectively. Although the AC grid 102 has an AC voltage and current, when considering a snapshot of those signals over a very short period of time, the signals are generally relatively constant. As such, for simplicity, the AC grid voltage ($V_{dc_2}$) and current ($I_{dc_2}$) signals may, in some embodiments, be approximated and otherwise treated as DC signals for the purposes of the control algorithms described herein.

The actuation signals $\theta_1$, $\theta_2$, and $\theta_3$ represent the phase angles between a reference point (e.g., an arbitrary or predetermined reference point) and the PWM signals for the DC-AC inverter 300, the cycloconverter 304, and the active filter 306. In the illustrative embodiment, the actuation signal $\theta_3$ of the active filter 306 serves as the reference angle and, therefore, $\theta_3$ is fixed to zero. As described below, in some embodiments, the inverter controller 308 may control the phase angle between the DC-AC inverter 300 and the active filter 306 using the actuation signal $\theta_1$ and control the phase angle between the cycloconverter 304 and the active filter 306 using the actuation signal $\theta_2$. It should be appreciated that when current lags voltage, the controller 108 may utilize zero voltage switching (ZVS) or soft switching to actuate the electrical switches of the inverter 106, whereas when current leads voltage, the controller must generally utilize hard switching. In the illustrative embodiment, the actuation signals $\theta_1$ and $\theta_2$ may be selected to allow for ZVS operation as described in greater detail below.

The method 1400 begins with block 1402 in which the controller 108 receives the sensed voltage $V_{dc_1}$ of the DC-AC inverter 300 (e.g., across the DC source 104) as dictated, for example, by an MPPT module of the DC-AC inverter 300 based on a command signal $V_{dc1\_cmd}$. The controller 108 utilizes a proportional integral (PI) controller with output saturation in block 1404 and a switch triggered based on a command signal $I_{dc1\_cmd}$ of the DC-AC inverter 300 in block 1406 to generate a source/panel current command ($I_{dc_1}$). In the illustrative embodiment, the PI controller scales the current of the DC source 104 (e.g., a PV panel) based on MPPT to maintain a steady voltage from the DC source 104. In block 1408, the controller 108 receives the sensed current $I_{dc_1}$ of the DC-AC inverter 300. In blocks 1410, 1412, 1414, the controller 108 utilizes a PI regulator in parallel with a harmonic compensator/regulator and output saturation to regulate the current from the DC source 104 and reduce double ripple feedback from the AC grid 102. More specifically, the harmonic regulator may reduce or eliminate a 120 Hz ripple from the AC grid 120 (i.e., from a power grid operating at 60 Hz). In some embodiments, the PI regulator and the harmonic regulator are configured to assume a fixed frequency operation; however, in some embodiments, throughout half of a grid cycle, the switching frequency may be varied to reduce power loss. Accordingly, in block 1416, frequency variation may be compensated for with a gain scheduling function that dynamically calculates an output gain $k_1$ (F). In other words, the gain scheduling function is a function of the switching frequency, F, that provides a scaling factor $k_1$ that may be used to scale the actuation signal. In some embodiments, the controller 108 may determine the switching frequency of the electrical switches of the inverter 106 based on, for example, a grid voltage (e.g., an instantaneous grid voltage) of the AC grid 102, the power production of the DC source 104, and one or more circuit parameters of the inverter 106 (e.g., LC parameters of the various resonant tank circuits of the inverter 106). In the illustrative embodiment, the output of block 1416 is the initial value for the actuation signal $\theta_1$.

In block 1418, the controller 108 applies a ZVS assurance function to the actuation signal to choose between the two corresponding linear operating regions based on the DC source voltage ($V_{dc_1}$) and the active filter voltage ($V_{dc_3}$). It should be appreciated that applying the phase angle $\theta_1$ and the phase angle $\pi-\theta_1$ result in the same (or approximately the same) DC source voltage. As such, in the illustrative embodiment, the controller 108 identifies the operating range associated with the phase angle $\theta_1$ or the phase angle $\pi-\theta_1$ where the AC current lags the AC voltage to ensure that soft switching may be utilized. In block 1420, the controller 108 selects the phase angle $\theta_1$ or the phase angle $\pi-\theta_1$ that permits soft switching as the final actuation signal $\theta_1$ to be provided to the PWM controller/generator 322. If the phase angle $\pi-\theta_1$ permits soft switching, then the controller 108 re-computes or reassigns the actuation variable/signal according to $\theta_1 \Leftarrow \pi-\theta_1$ in block 1422.

It should be appreciated that the controller 108 may determine the actuation signal $\theta_2$ corresponding with the cycloconverter 304 in a manner similar to the determination of the actuation signal $\theta_1$. In particular, in block 1450, the controller 108 receives the sensed voltage $V_{dc_3}$ of the active filter 306 (e.g., across the energy storage device 320) based on a command signal $V_{dc3\_cmd}$. The controller 108 utilizes a proportional integral (PI) controller with output saturation in block 1452, a notch filter tuned to twice the grid frequency of the AC grid 102 in block 1454, and a switch triggered based on a command signal $I_{dc2\_cmd}$ of the cycloconverter 304 to generate an intermediate current command signal in block 1456. In block 1458, the controller 108 multiplies the intermediate current command signal by a unity gain cosine function $\cos(\theta_e)$ that is in-phase with the grid voltage of the AC grid 102, which results in the grid current command $I_{dc2*}$. In the illustrative embodiment, the parameter $\theta_e$ is indicative of a grid angle estimation, and may be determined utilizing a phase locked loop (PLL) or other suitable angle estimator.

In block 1460, the controller 108 receives the sensed current $I_{dc2}$ of the cycloconverter 304. In blocks 1460, 1462, 1466, the controller 108 utilizes a PI regulator in parallel with a harmonic compensator/regulator and output saturation to regulate the active filter capacitor voltage ($V_{dc_3}$) and reduce double ripple feedback from the AC grid 102. In block 1468, frequency variation may be compensated for with a gain scheduling function that dynamically calculates an output gain $k_2(F)$ in a manner similar to the calculation of $k_1(F)$ described above. In other words, the gain scheduling function provides a scaling factor $k_2$ that may be used to scale the switching frequency. In the illustrative embodiment, the output of block 1468 is the initial value for the actuation signal $\theta_2$.

In block 1470, the controller 108 applies a ZVS assurance function to the actuation signal to choose between the two corresponding linear operating regions based on the grid voltage ($V_{dc_2}$), the active filter voltage ($V_{dc_3}$), and the grid angle estimation ($\theta_e$). In block 1472, the controller 108 selects the phase angle $\theta_2$ or the phase angle $\pi-\theta_2$ that permits soft switching as the final actuation signal $\theta_2$ to be provided to the PWM controller/generator 322. If the phase angle $\pi-\theta_2$ permits soft switching, then the controller 108 re-computes or reassigns the actuation variable/signal according to $\theta_2 \Leftarrow \pi-\theta_2$ in block 1474. It should be appreciated that, in some embodiments, blocks 1402-1420 and 1450-1472 may be performed in parallel. In block 1480, the controller 108 or, more specifically, the PWM controller 322 generates PWM signals based on the actuation signals $\theta_1$ and $\theta_2$ (i.e., based on the phase shifts) for control of the electrical switches of the inverter 106. In particular, the PWM controller 322 generates a PWM signal for actuation of the electrical switches of the DC-AC inverter 300, a PWM signal for actuation of the electrical switches of the cycloconverter 304, and a PWM signal for actuation of the electrical switches of the active filter 306. As described above, in some embodiments, each of the PWM signals has a 50% duty cycle with an appropriate dead time (e.g., approximately a 50% duty cycle).

Figure 15:
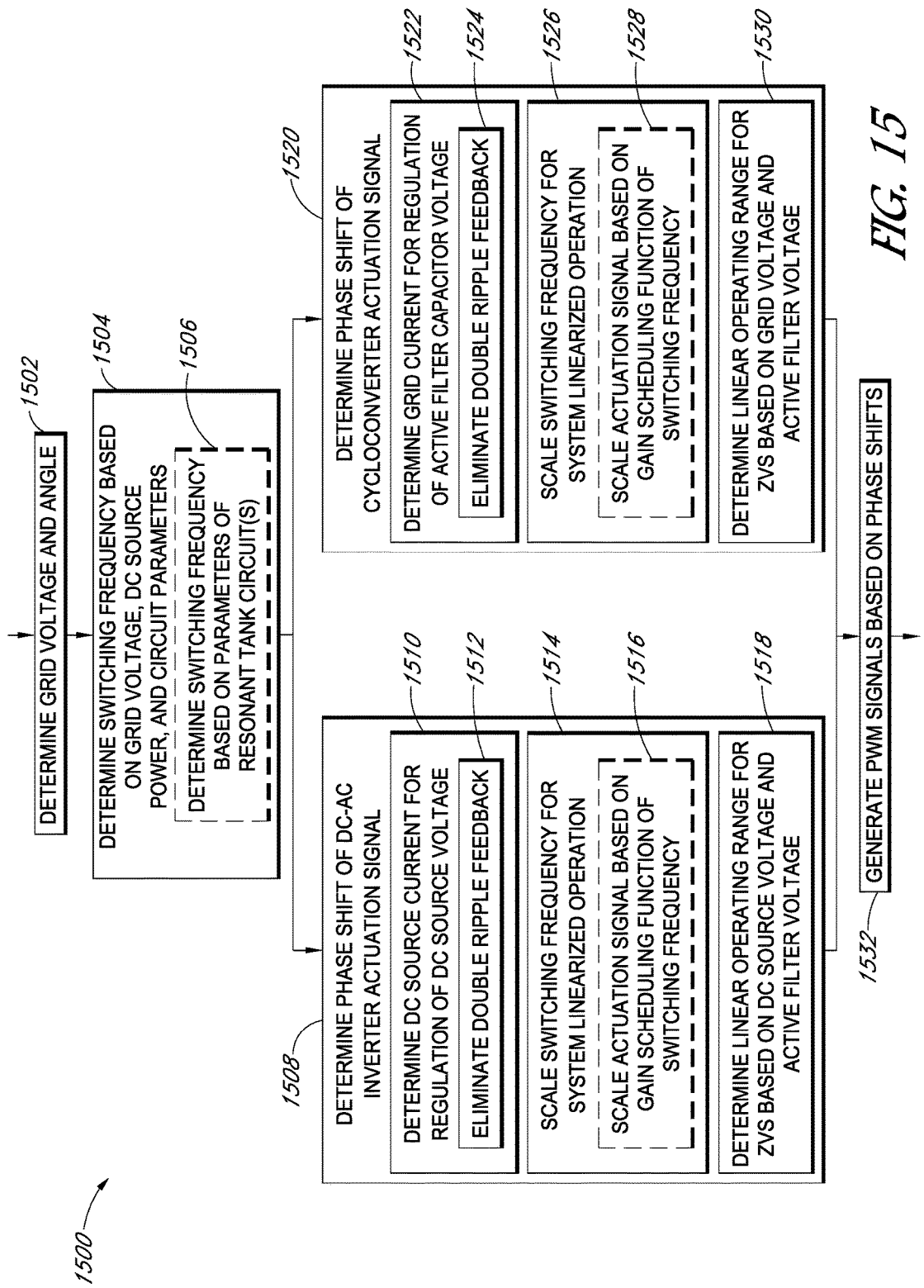
FIG. 15 is a simplified flow diagram of another embodiment of a method for controlling the inverter of FIG. 1.

Referring now to FIG. 15, in some embodiments, the inverter controller 308 may execute a method 1500 for closed-loop control of the inverter 106. The method begins with block 1502 in which the inverter controller 308 determines the grid voltage $V_{dc_2}$ of the AC grid 102 and estimates the angle ($\theta_e$) of the grid voltage. As described above, the controller 308 may utilize a PLL or other suitable angle estimator to do so. In block 1504, the controller 108 determines the switching frequency of the electrical switches of the inverter 106 based on the grid voltage (e.g., the instantaneous grid voltage) and/or other circuit parameters. For example, the switching frequency may be determined based on the input power of the DC source 104, component values of various components of the inverter 106 (e.g., component inductances and/or capacitances), and/or operating values of the inverter 106 (e.g., voltages and/or currents at various points in the inverter 106). For example, in block 1506, the controller 108 may determine the switching frequency based on the parameters of one or more of the resonant tank circuits of the inverter 106 (e.g., inductance and capacitance values).

In block 1508, the controller 108 determines a phase shift of the actuation signal ($\theta_1$) for the electrical switches of the DC-AC inverter 300 relative to the actuation signal (e.g., $\theta_3=0$) for the electrical switches of the active filter 306. To do so, in block 1510, the controller 108 may determine the DC source current for regulation of the DC source voltage of the DC source 104 (e.g., PV panel) based on a suitable MPPT technique. Further, in block 1512, the controller 108 may eliminate double ripple feedback from the AC grid 102. In block 1514, the controller 108 may scale the switching frequency for system linearized operation as described above. In particular, in block 1516, the controller 108 may scale the actuation signal of the DC-AC inverter 300 based on a gain scheduling function of switching frequency. In block 1518, the controller 108 may determine a linear operating range for zero-voltage switching based on the DC source voltage and the active filter voltage.

In block 1520, the controller 108 determines a phase shift of the actuation signal ($\theta_2$) for the electrical switches of the cycloconverter 304 relative to the actuation signal for the electrical switches of the active filter 306. To do so, in block 1522, the controller 108 may determine the grid current of the AC grid 102 for regulation of the active filter capacitor voltage (e.g., across the energy storage device 320) of the active filter 306. Further, in block 1524, the controller 108 may eliminate double ripple feedback from the AC grid 102. In block 1526, the controller 108 may scale the switching frequency for system linearized operation as described above. In particular, in block 1528, the controller 108 may scale the actuation signal of the cycloconverter 304 based on a gain scheduling function of switching frequency. In block 1530, the controller 108 may determine a linear operating range for zero-voltage switching based on the grid voltage and the active filter voltage. It should be appreciated that, in some embodiments, the blocks 1508 and 1520 may be performed in parallel.

In block 1532, the controller 108 generates a set of PWM signals for actuation of the electrical switches of the inverter 106 based on the determined phase shifts $\theta_1$ and $\theta_2$. In particular, the controller 108 may generate a PWM signal for actuation of the electrical switches of the DC-AC inverter 300, a PWM signal for actuation of the electrical switches of the cycloconverter 304, and a PWM signal for actuation of the electrical switches of the active filter 306.

Figure 17:
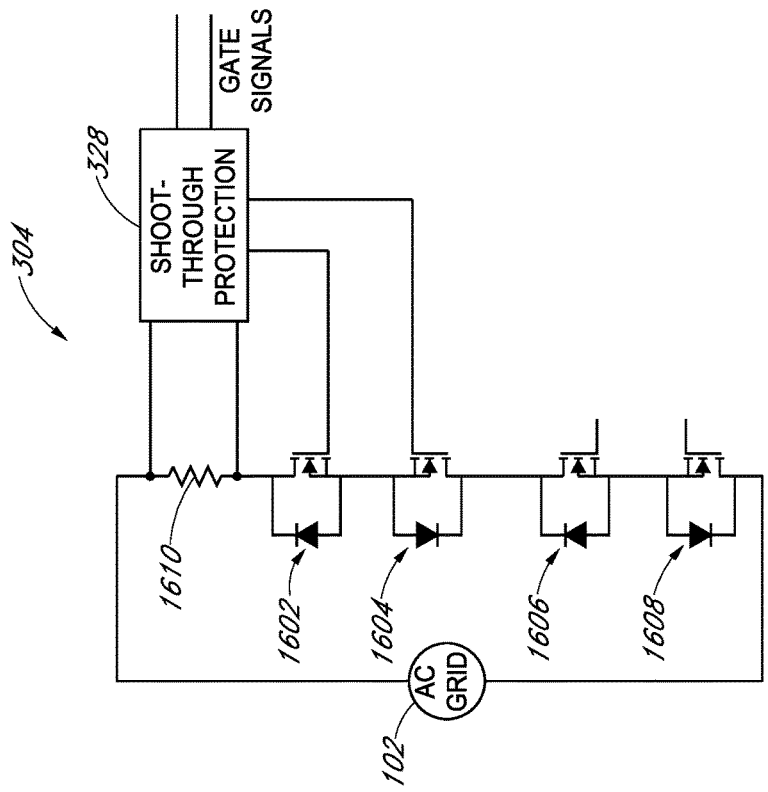
FIGS. 16-17 are simplified electrical schematics of various embodiments of shoot-through fault circuitry of the inverter of FIG. 3.
Figure 16:
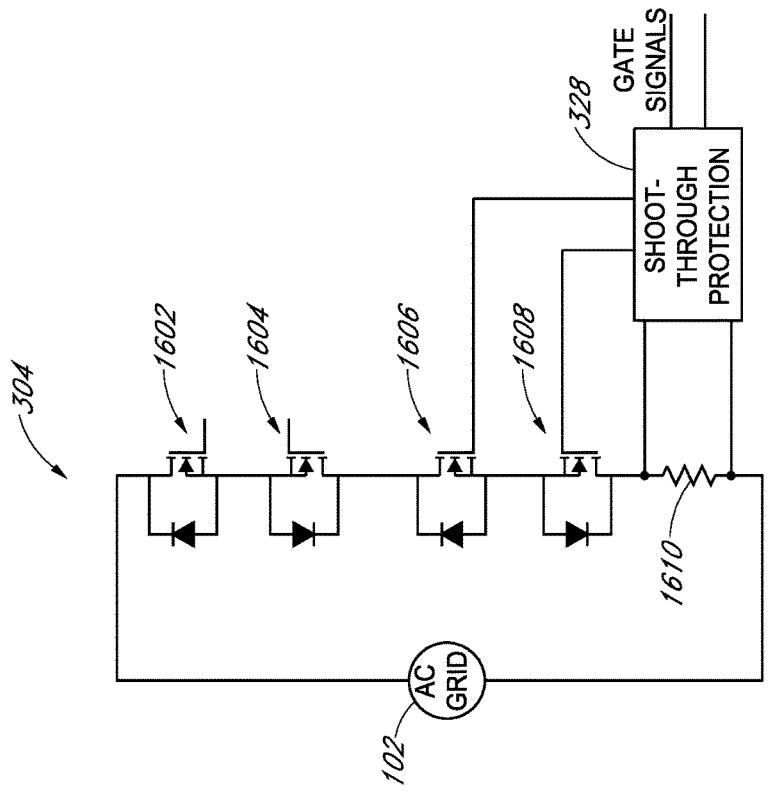

Referring now to FIGS. 16-17, a portion of the cycloconverter 304 is shown with various embodiments of shoot-through fault protection circuit 328. As shown and described above, the cycloconverter 304 may include an AC-AC converter circuit 314 that is embodied as a half-bridge switching circuit having a pair of "upper" electrical switches 1602, 1604 and a pair of "lower" electrical switches 1606, 1608. During operation, the cycloconverter 304 may switch in synchronism with the grid voltage polarity. For example, when the grid voltage of the AC grid 102 is positive, the lower switch of each pair of electrical switches (i.e., switches 1604, 1608) is switched on, whereas when the grid voltage is negative, the upper switch of each pair of electrical switches (i.e., switches 1602, 1606) is on. In some embodiments, a PLL or other grid synchronization technique may be utilized to estimate the grid angle; however, during grid disturbances and/or other events, the synchronization may be lost such that the wrong switches are turned on thereby resulting in a shoot-through fault. A shoot-through fault may pass a very high current through the cycloconverter 304 switching leg, which may damage the circuitry.

Accordingly, in some embodiments, the inverter 106 may include a shoot-through fault protection circuit 328 electrically coupled to the cycloconverter 304 and configured to detect and manage shoot-through faults. In particular, the shoot-through fault protection circuit 328 may be adapted to determine whether a current sensed in the cycloconverter 304 exceeds a current threshold value and limit the current in response to a determination that the current exceeds the current threshold value. For example, the shoot-through fault protection circuit 328 may override control gate signals of the cycloconverter 304 and force the electrical switches of the cycloconverter 304 to a passive state. In the illustrative embodiment, the shoot-through fault protection circuit 328 includes a current sense resistor 1610 electrically coupled in series with the "upper" switches or the "lower switches" of the cycloconverter 304 and a differential circuit for detecting the fault. As shown in FIG. 16, the shoot-through fault protection circuit 328 is electrically coupled to the lower electrical switches 1606, 1608, whereas in the embodiment of FIG. 17, the shoot-through fault protection circuit 328 is electrically coupled to the upper electrical switches 1602, 1604.

Figure 18:
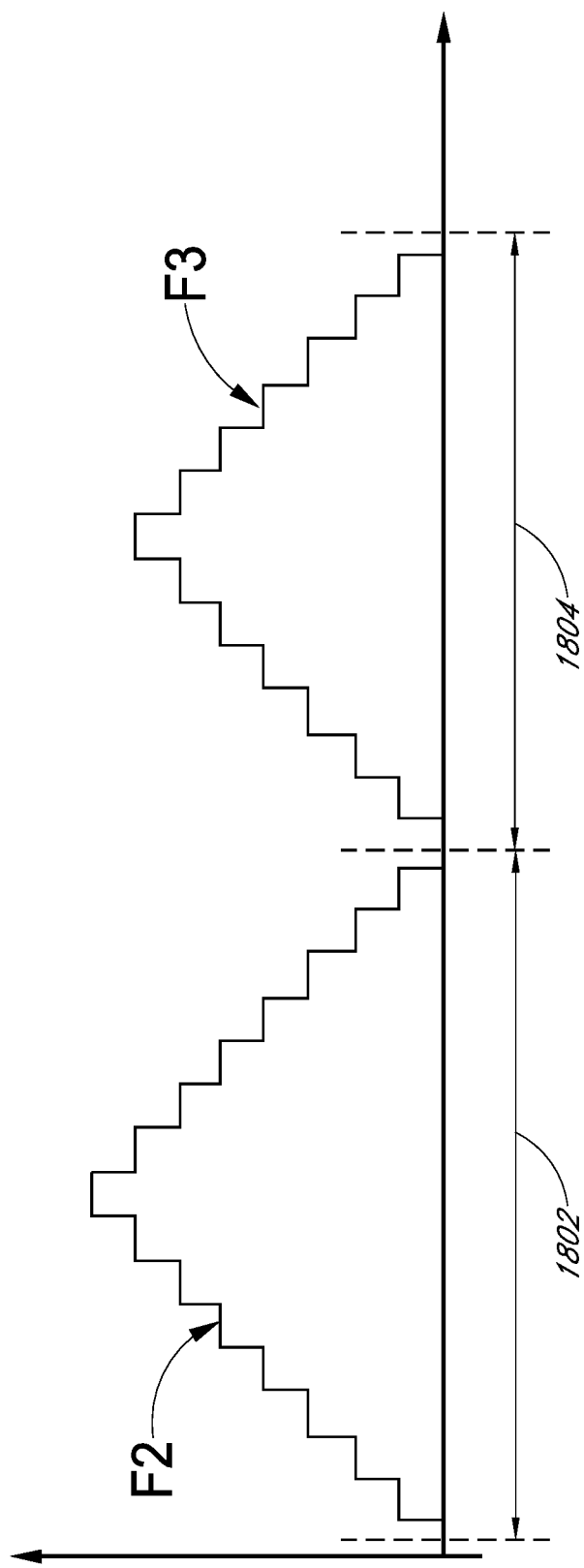
FIG. 18 is a simplified diagram of an asymmetric pulse width modulated waveform.

Referring now to FIG. 18, a simplified diagram of an asymmetric pulse width modulated waveform is shown. It should be appreciated that the use of a microcontroller or digital signal processor for generating PWM frequencies generally has inherent inefficiencies associated with the quantized nature of the architecture. For example, in some embodiments, up/down counters and comparators are utilized to generate switching frequencies (e.g., the frequencies F2 and F3). However, in some embodiments, a desired switching frequency falls between two of the available quantized switching frequencies that have predetermined switching periods 1802, 1804. In such embodiments, the controller 108 may generate one or more PWM signals by alternating between two or more different available switching frequencies. In particular, the controller 108 may alternate between the switching frequencies based on a weighted average of the frequencies that approximates the desired frequency. For example, if a desired frequency is halfway between the frequencies F2 and F3, the controller 108 may generate a PWM signal that alternates equally between the frequencies F2 and F3. However, if the desired frequency is close to F2 than F3, the controller 108 may generate a PWM signal that alternates between the frequencies F2 and F3 such that F2 is utilized more frequently than F3 based on the corresponding weighted average.

It should be appreciated that the inverter controller 108 may utilize various other techniques to control operations of inverter 106. For example, in some embodiments, the controller 108 may utilize an alternative mode of operation for controlling the electrical switches of the inverter 106. That is, in normal operation, all three ports of the inverter 106 (i.e., the DC-AC inverter 300, the cycloconverter 304, and the active filter 306) receive PWM signals to actuate the corresponding electrical switches of those components. However, during the alternative mode of operation, the inverter controller 108 may disable the PWM signal transmission to one of the ports (i.e., the DC-AC inverter 300, the cycloconverter 304, or the active filter 306), which results in lower switching losses. In particular, in some embodiments, the PWM signal transmission to the port may be disabled every other switching period, which may reduce the number of switching instances of that port by fifty percent. For example, in some embodiments, the PWM signals supplied to the active filter 306 may be disabled every other switching period.

There is a plurality of advantages of the present disclosure arising from the various features of the apparatuses, circuits, and methods described herein. It will be noted that alternative embodiments of the apparatuses, circuits, and methods of the present disclosure may not include all of the features described yet still benefit from at least some of the advantages of such features. Those of ordinary skill in the art may readily devise their own implementations of the apparatuses, circuits, and methods that incorporate one or more of the features of the present disclosure and fall within the spirit and scope of the present invention as defined by the appended claims.

The invention claimed is:

1. An inverter for converting an input direct current (DC) waveform from a DC source to an output alternating current (AC) waveform for delivery to an AC grid, the inverter comprising:
  a transformer that includes a first winding, a second winding, and a third winding;
  a DC-AC inverter electrically coupled to the first winding of the transformer, wherein the DC-AC inverter is adapted to convert the input DC waveform to an AC waveform delivered to the transformer at the first winding;
  a cycloconverter electrically coupled to the second winding of the transformer, wherein the cycloconverter is adapted to convert an AC waveform received at the second winding of the transformer to the output AC waveform having a grid frequency of the AC grid, and wherein the second winding has at least one terminal, the cycloconverter having an inductor connected directly to the at least one terminal; and an active filter electrically coupled to the third winding of the transformer, wherein the active filter is adapted to sink and source power with one or more energy storage devices based on a mismatch in power between the DC source and the AC grid.

2. The inverter of claim 1, wherein the DC-AC inverter comprises a full-bridge inverter circuit.

3. The inverter of claim 2, wherein the first winding includes a first terminal and a second terminal;
wherein the full-bridge inverter circuit comprises a first electrical switch electrically coupled to a second electrical switch at a first node and a third electrical switch electrically coupled to a fourth electrical switch at a second node;
wherein the DC-AC inverter comprises a capacitor and an inductor electrically coupled in series with the first node and the first terminal; and
wherein the second terminal is electrically coupled to the second node.

4. The inverter of claim 2, wherein the first winding includes a first terminal and a second terminal;
wherein the full-bridge inverter circuit comprises a first electrical switch electrically coupled to a second electrical switch and the first terminal at a first node and a third electrical switch electrically coupled to a fourth switch and the second terminal at a second node.

5. The inverter of claim 2, wherein the first winding includes a first terminal and a second terminal;
wherein the full-bridge inverter circuit comprises a first electrical switch electrically coupled to a second electrical switch at a first node and a third electrical switch electrically coupled to a fourth electrical switch at a second node;
wherein the DC-AC inverter comprises an inductor electrically coupled to the first node and the first terminal and a capacitor electrically coupled to the second node and the second terminal.

6. The inverter of claim 1, wherein the cycloconverter comprises a set of electrical switches and a capacitor divider electrically coupled with the set of electrical switches.

7. The inverter of claim 6, wherein the second winding includes the at least one terminal having a first terminal and a second terminal;
wherein the set of electrical switches comprises a first subset of electrical switches electrically coupled to a second subset of electrical switches at a first node;
wherein the capacitor divider comprises a first capacitor electrically coupled to a second capacitor and the first terminal at a second node; and
wherein the cycloconverter comprises the inductor electrically coupled to the second terminal and the first node.

8. The inverter of claim 7, wherein each of the first subset of electrical switches and the second subset of electrical switches consists of a pair of blocking switches electrically coupled in series.

9. The inverter of claim 1, wherein the active filter comprises a full-bridge switching circuit electrically coupled to the one or more energy storage devices.

10. The inverter of claim 9, wherein the third winding includes a first terminal and a second terminal; and
wherein the full-bridge switching circuit comprises a first electrical switch electrically coupled to a second electrical switch and the first terminal at a first node and a third electrical switch electrically coupled to a fourth electrical switch and the second terminal at a second node.

11. The inverter of claim 9, wherein the third winding includes a first terminal and a second terminal;
wherein the full-bridge switching circuit comprises a first electrical switch electrically coupled to a second electrical switch at a first node and a third electrical switch electrically coupled to a fourth electrical switch at a second node;
wherein the active filter comprises an inductor electrically coupled to the first node and the first terminal and a capacitor electrically coupled to the second node and the second terminal.

12. The inverter of claim 1, wherein the active filter comprises the one or more energy storage devices, a half-bridge switching circuit, and a capacitor divider electrically coupled to the one or more energy storage devices and the half-bridge switching circuit.

13. The inverter of claim 12, wherein the third winding includes a first terminal and a second terminal;
wherein the half-bridge switching circuit comprises a first electrical switch electrically coupled to a second electrical switch and the first terminal at a first node; and
wherein the capacitor divider comprises a first capacitor electrically coupled to a second capacitor and the second terminal at a second node.

14. The inverter of claim 12, wherein the third winding includes a first terminal and a second terminal;
wherein the half-bridge switching circuit comprises a first electrical switch electrically coupled to a second electrical switch and the first terminal at a first node;
wherein the capacitor divider comprises a first capacitor electrically coupled to a second capacitor at a second node; and
wherein the active filter comprises an inductor electrically coupled to the second terminal and the second node.

15. The inverter of claim 1, wherein the one or more energy storage devices consists of a capacitor.

16. The inverter of claim 1, wherein the DC source comprises a photovoltaic module.

17. An inverter for converting an input direct current (DC) waveform from a DC source to an output alternating current (AC) waveform for delivery to an AC grid, the inverter comprising:
a controller having a processor and a memory;
a transformer that includes a first winding, a second winding, and a third winding;
a DC-AC inverter electrically coupled to the first winding of the transformer, wherein the DC-AC inverter is adapted to convert the input DC waveform to an AC waveform delivered to the transformer at the first winding;
a cycloconverter electrically coupled to the second winding of the transformer, wherein the cycloconverter is adapted to convert an AC waveform received at the second winding of the transformer to the output AC waveform having a grid frequency of the AC grid, and wherein the second winding has at least one terminal, the cycloconverter having an inductor connected directly to the at least one terminal; and
an active filter electrically coupled to the third winding of the transformer and comprising a plurality of electrical switches and one or more energy storage devices,
wherein the controller is adapted to control the switching cycles of the plurality of electrical switches of the active filter to sink and source power with the one or more energy storage devices based on a mismatch in power between the DC source and the AC grid.

18. The inverter of claim 17, wherein the controller is adapted to control the switching cycles of the plurality of electrical switches using zero-voltage switching.

19. The inverter of claim 17, wherein the DC source comprises a photovoltaic module.

20. An inverter for converting an input direct current (DC) waveform from a DC source to an output alternating current (AC) waveform for delivery to an AC grid, the inverter comprising:
- a transformer that includes a first winding, a second winding, and a third winding;
- a DC-AC inverter electrically coupled to the first winding of the transformer, wherein the DC-AC inverter is adapted to convert the input DC waveform to an AC waveform delivered to the transformer at the first winding;
- a cycloconverter electrically coupled to the second winding of the transformer, wherein the cycloconverter is adapted to convert an AC waveform received at the second winding of the transformer to the output AC waveform having a grid frequency of the AC grid, and wherein the second winding has at least one terminal, the cycloconverter having an inductor connected directly to the at least one terminal;
- an active filter electrically coupled to the third winding of the transformer and comprising a plurality of electrical switches and one or more energy storage devices;
- a processor; and
- a memory comprising a plurality of instructions stored thereon that, in response to execution by the processor, causes the inverter to control the switching cycles of the plurality of electrical switches of the active filter to sink and source power with the one or more energy storage devices based on a mismatch in power between the DC source and the AC grid.

\* \* \* \* \*